US008073649B2

(12) United States Patent
Sano et al.

(10) Patent No.: US 8,073,649 B2
(45) Date of Patent: Dec. 6, 2011

(54) PORTABLE ELECTRONIC APPARATUS, OPERATION CONTROL METHOD, OPERATION CONTROL PROGRAM, SIGNAL GENERATION APPARATUS AND SIGNAL GENERATION METHOD

(75) Inventors: Akane Sano, Tokyo (JP); Kenichi Makino, Kanagawa (JP); Motoyuki Takai, Tokyo (JP); Hiroshi Ito, Kanagawa (JP); Makoto Inoue, Tokyo (JP); Katsuya Shirai, Kanagawa (JP); Hirofumi Tamori, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/604,104

(22) Filed: Oct. 22, 2009

(65) Prior Publication Data

US 2010/0042359 A1 Feb. 18, 2010

Related U.S. Application Data

(63) Continuation of application No. 11/768,541, filed on Jun. 26, 2007, now Pat. No. 7,698,092.

(30) Foreign Application Priority Data

Jul. 27, 2006 (JP) .................. 2006-204776

(51) Int. Cl.
*G01P 15/00* (2006.01)
*G01C 9/00* (2006.01)
*G06F 3/033* (2006.01)
*G06F 19/00* (2006.01)
(52) U.S. Cl. ......... 702/141; 702/150; 345/158; 463/37
(58) Field of Classification Search .......... 702/141, 702/150; 463/37; 345/158
See application file for complete search history.

(56) References Cited

U.S. PATENT DOCUMENTS

| 6,079,025 | A | 6/2000 | Fung |
| 6,921,332 | B2 | 7/2005 | Fukunaga et al. |
| 7,184,020 | B2 * | 2/2007 | Matsui .................. 345/156 |
| 7,221,909 | B2 | 5/2007 | Kiyose |
| 7,508,374 | B2 | 3/2009 | Tsunoda |
| 2006/0103624 | A1 | 5/2006 | Ishito et al. |
| 2006/0287085 | A1 | 12/2006 | Mao et al. |
| 2007/0013659 | A1 | 1/2007 | Nagata et al. |
| 2007/0156679 | A1 | 7/2007 | Kretz et al. |

FOREIGN PATENT DOCUMENTS

| JP | 2-69693 | 3/1990 |
| JP | 2000-47813 | 2/2000 |
| JP | 2006-17874 | 1/2006 |
| JP | 2006-54021 | 2/2006 |

* cited by examiner

*Primary Examiner* — Eliseo Ramos Feliciano
*Assistant Examiner* — Janet Suglo
(74) *Attorney, Agent, or Firm* — Oblon, Spivak, McClelland, Maier & Neustadt, L.L.P.

(57) ABSTRACT

A portable electronic apparatus includes an acceleration detection unit, an evaluation-signal generation unit, and a control unit. The acceleration detection unit is configured to detect an acceleration generated in the portable electronic apparatus. The evaluation-signal generation unit is configured to carry out a predetermined process based on the acceleration detected by the acceleration detection unit in order to generate an evaluation signal representing the amplitude and positive or negative polarity of the acceleration. The control unit is configured to produce a result of determination as to whether or not the portable electronic apparatus has been driven to make a predetermined movement on the basis of the evaluation signal and carrying out a predetermined operation on the basis of the result of determination.

14 Claims, 19 Drawing Sheets

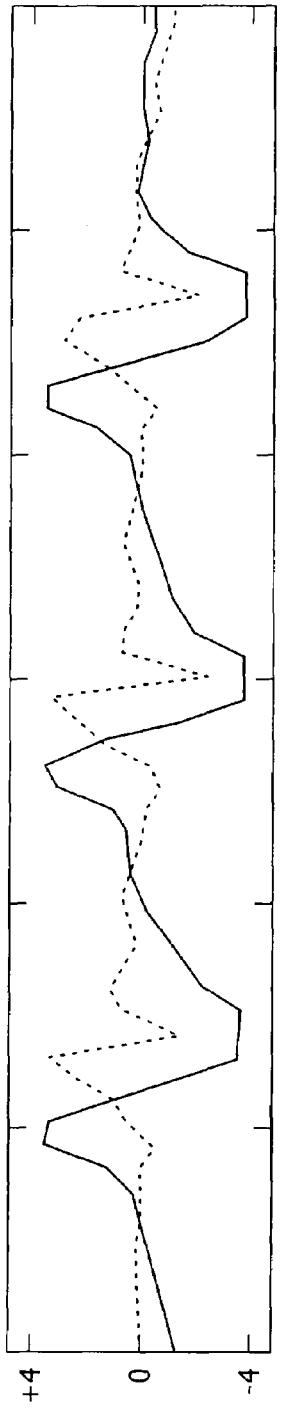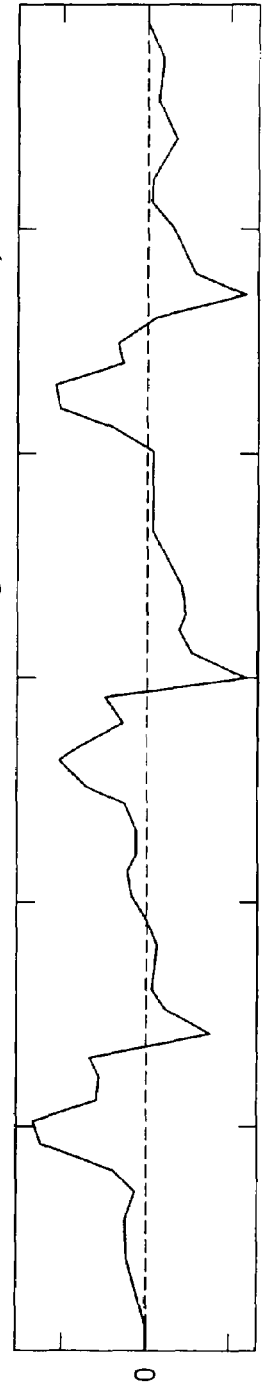

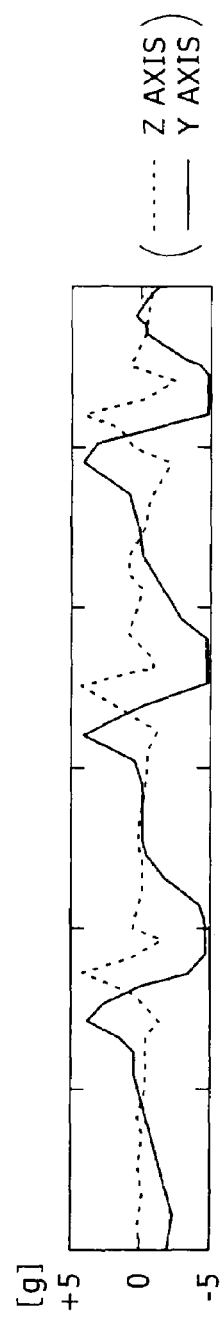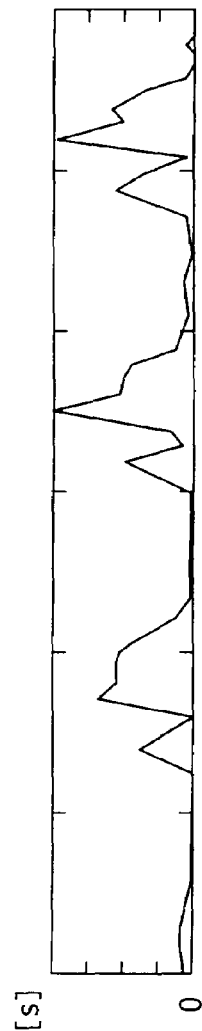

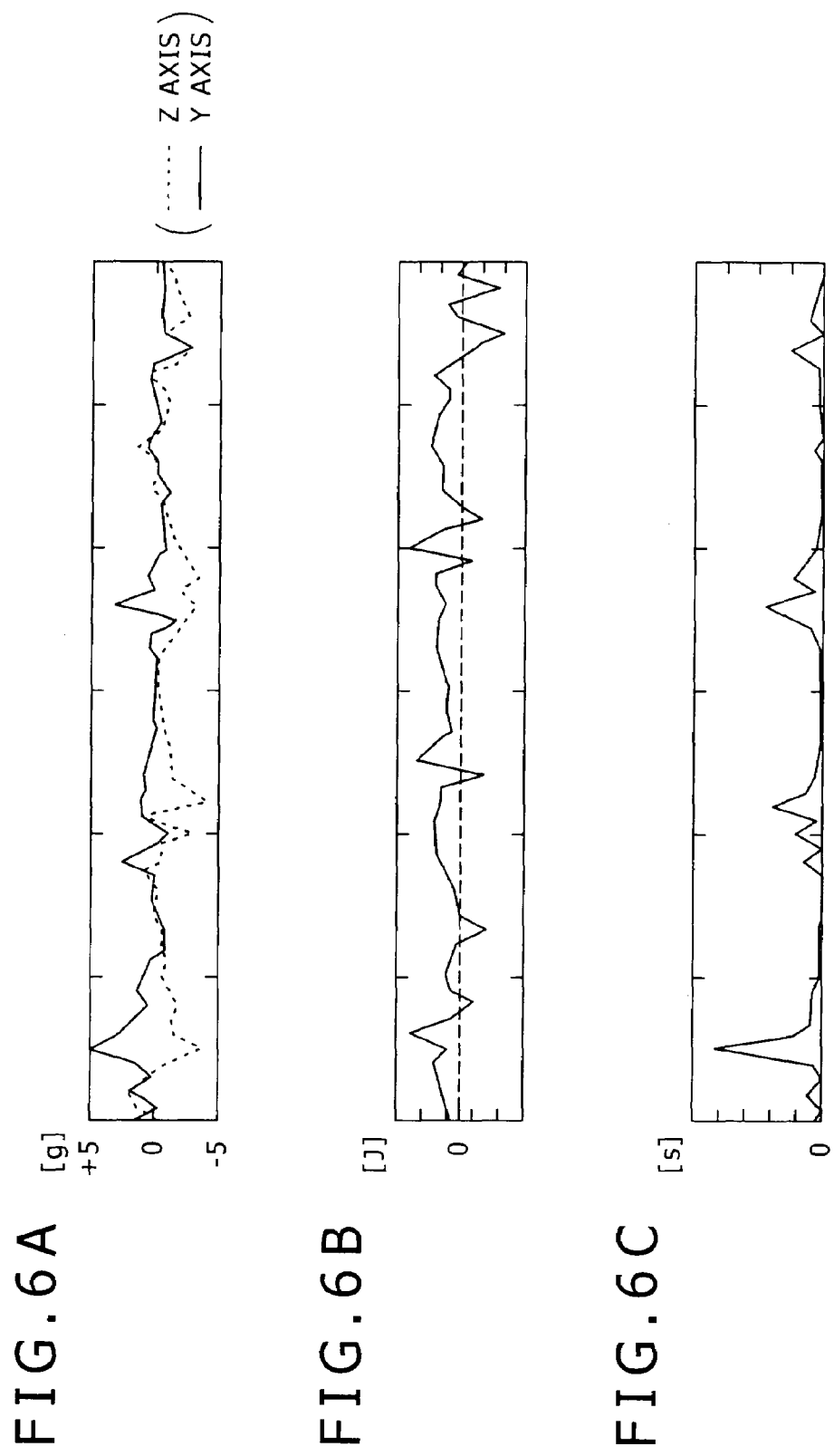

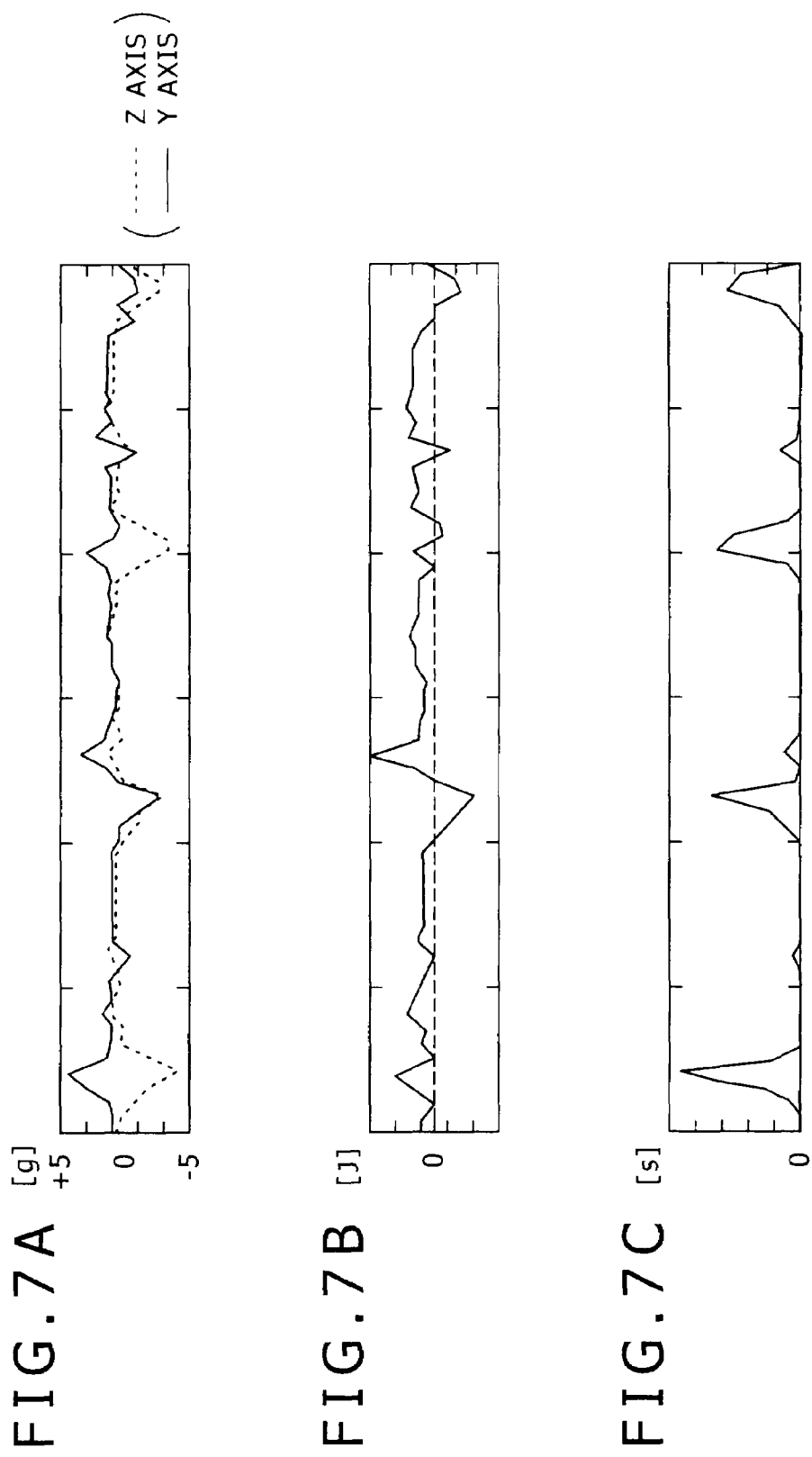

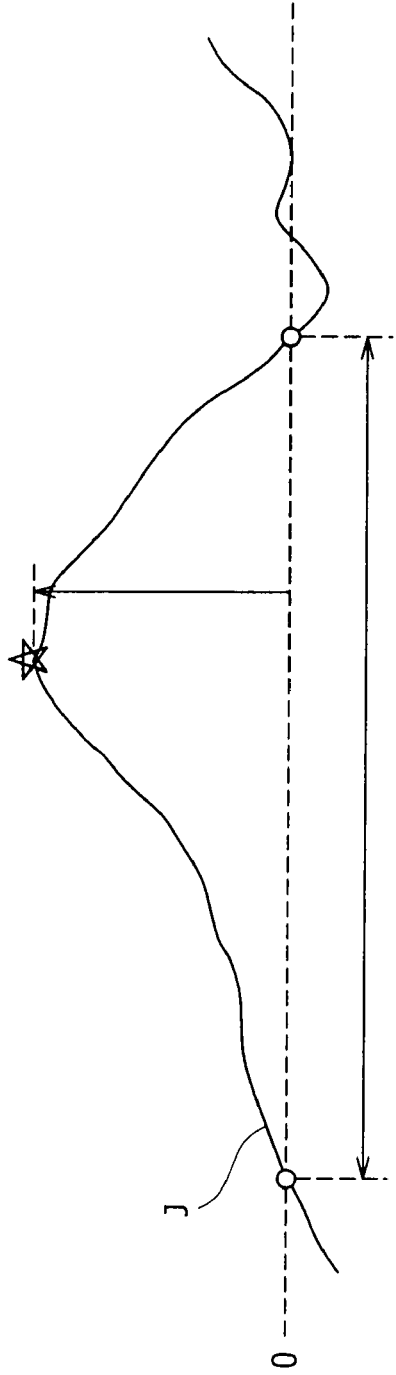

PORTABLE ELECTRONIC APPARATUS, OPERATION CONTROL METHOD, OPERATION CONTROL PROGRAM, SIGNAL GENERATION APPARATUS AND SIGNAL GENERATION METHOD

CROSS REFERENCES TO RELATED APPLICATIONS

This application is a continuation of and claims the benefit of priority under 35 U.S.C. §120 from U.S. application Ser. No. 11/768,541 filed Jun. 26, 2007, which claims the benefit of priority under 35 U.S.C. §119 from Japanese Patent Application JP 2006-204776 filed Jul. 27, 2006, the entire contents of each which are being incorporated herein by reference.

BACKGROUND OF THE INVENTION

1. Field of the Invention

The present invention relates to a portable electronic apparatus, an operation control method adopted by the portable electronic apparatus and an operation control program implementing the operation control method. More particularly, the present invention relates to a portable electronic apparatus having an acceleration detection unit configured to detect an acceleration, an operation control method usable in the portable electronic apparatus and an operation control program implementing the operation control method. In addition, the present invention also relates to an evaluation-signal generation apparatus for generating an evaluation signal on the basis of an acceleration detected by the acceleration detection unit as a signal optimum for detection of a predetermined movement of the portable electronic apparatus and relates to a signal generation method adopted by the evaluation-signal generation apparatus.

2. Description of the Related Art

The reader is suggested to refer to Japanese Patent Laid-open No. 2006-17874 used as Patent Document 1 and Japanese Patent Laid-open No. Hei 2-69693 used as Patent Document 2.

In some cases, the number of operation components that can be employed in an electronic apparatus or, in particular, a portable electronic apparatus, is deliberately limited and a design requirement of the apparatus. For example, some portable music players or the like employ only basic-operation components such as playback, stop and volume-adjustment buttons. In the case of such a portable electronic apparatus, the user carries out operations other than the basic operations by typically making use of a menu appearing on a display screen of the apparatus. In this way, the portable electronic apparatus allows the user to carry out operations other than the basic operations while having a compact size and an improved design. If the user has to carry out a specific operation other than the basic operations on the portable electronic apparatus by making use of a menu appearing on a display screen of the apparatus, however, the user may have to go through a number of hierarchical menu layers till the user reaches a desired menu item representing the specific operation. Thus, the designer of the portable electronic apparatus has to consider fear of the deteriorated operatability of the apparatus.

On the other hand, some portable electronic apparatus designed in recent years employ an interface for detecting an operation carried out by the user by making use of an acceleration sensor. For example, Patent Document 1 describes a portable electronic apparatus capable of detecting a movement caused by the user as a movement of the apparatus on the basis of a signal generated by an acceleration sensor employed in the apparatus and issuing a predetermined instruction on the basis of a result of the detection (an example of the movement caused by the user is a movement caused by hand shaking or hand striking). On the other hand, Patent Document 2 describes a portable electronic apparatus capable of detecting a movement caused by the user as a movement of the apparatus on the basis of a signal generated by an acceleration sensor employed in the apparatus in the same way as the apparatus disclosed in Patent Document 1 and changing the mode of a clock on the basis of a result of the detection. Since the portable electronic apparatus is capable of detecting a movement caused by the user as a movement of the apparatus on the basis of a signal generated by an acceleration sensor employed in the apparatus as described above, the number of operation components to be provided in the apparatus can be reduced by a quantity according to the capability.

SUMMARY OF THE INVENTION

By the way, in the existing technologies described in Patent Documents 1 and 2, a result of comparing the amplitude of an acceleration with a threshold value determined in advance is used to produce a result of determination as to whether or not the body of an apparatus has made a predetermined movement. With this movement detection technique, however, it is feared that an incorrect result of determination is produced in some cases. That is to say, it is necessary to consider cases in which the portable electronic apparatus is used by a walking user or a running user. In addition, it is also necessary to assume that the portable electronic apparatus is carried by the user by hanging the apparatus from a strap or putting the apparatus in a back pack. In such cases, it is quite within the bounds of possibility that the acceleration sensor undesirably generates an acceleration signal having an amplitude equivalent to the amplitude of an acceleration signal, which is generated when the user actually takes an action by shaking or hitting the portable electronic apparatus as described above. Thus, by merely comparing the amplitude of an acceleration with a threshold value determined in advance in order to produce a result of determination as to whether or not the body of an apparatus has made a predetermined movement, there is higher probability that an incorrect result of determination is produced.

Addressing the problems described above, inventors of the present invention have innovated a portable electronic apparatus including:

an acceleration detection unit configured to detect an acceleration generated in the portable electronic apparatus;

an evaluation-signal generation unit configured to carry out a predetermined process based on the acceleration detected by the acceleration detection unit in order to generate an evaluation signal representing the amplitude and positive or negative polarity of the acceleration; and a control unit configured to produce a result of determination as to whether or not the portable electronic apparatus has been driven to make a predetermined movement on the basis of the evaluation signal generated by the evaluation-signal generation unit and carrying out a predetermined operation on the basis of the result of determination.

In addition, the inventors also innovated an evaluation-signal generation apparatus for generating an evaluation signal by:

computing the absolute value of a present acceleration detected at the present point of time by an acceleration detection unit for detecting an acceleration;

finding an average of absolute values each computed as the absolute value of an acceleration detected by the acceleration detection unit at one of points of time in a predetermined period of time in the past; and subtracting the average from the absolute value of the present acceleration in order to give a value of the evaluation signal at the present point of time.

In accordance with the present invention, the evaluation-signal generation unit is capable of carrying out a predetermined process based on the acceleration detected by the acceleration detection unit in order to generate an evaluation signal representing the amplitude and positive or negative polarity of the acceleration. In accordance with the portable electronic apparatus provided by the present invention, the control unit employed in the portable electronic apparatus is capable of producing a result of determination as to whether or not the portable electronic apparatus has been driven to make a predetermined movement on the basis of the evaluation signal generated by the evaluation-signal generation unit as a signal representing not only the amplitude of the acceleration, but also the positive or negative polarity of the acceleration. Thus, the control unit is capable of properly producing a result of determination as to whether or not the portable electronic apparatus has been driven to make a predetermined movement including back-and-forth motions due to an operation such as particularly a shaking operation carried out on the portable electronic apparatus. As a result, it is possible to produce a result of determination as to whether or not the portable electronic apparatus has made a predetermined movement more accurately than the existing technology of merely comparing the amplitude of an acceleration with a threshold value determined in advance.

In a process to produce a result of determination as to whether or not the body of an apparatus has made a predetermined movement, (that is, whether or not the user has carried out an operation determined in advance, on the basis of an acceleration signal generated by the acceleration detection unit in accordance with the present invention as described above), the precision of the determination can be made better than the existing technology and the probability that an incorrect result of determination is produced can be reduced substantially.

BRIEF DESCRIPTION OF THE DRAWINGS

These and other features of the present invention will become clear from the following description of the preferred embodiments given with reference to the accompanying diagrams, in which:

FIG. 4A is a diagram showing the waveforms of acceleration signals each output by an acceleration sensor employed in the portable electronic apparatus;

FIG. 4B is a diagram showing the waveform of an evaluation signal as a waveform to be compared with the waveforms of the acceleration signals;

FIG. 5A is a diagram showing the waveforms of acceleration signals g each output in a shake operation;

FIG. 5B is a diagram showing the waveform of an evaluation signal J output in a shake operation;

FIG. 5C is a diagram showing the waveform of an evaluation signal s computed on the basis of areas beneath the waveforms of the acceleration signals g in a shake operation;

FIG. 6A is a diagram showing the waveforms of acceleration signals g each output while the portable electronic apparatus is being carried by the user by being inserted into a back pack;

FIG. 6B is a diagram showing the waveform of an evaluation signal J output while the portable electronic apparatus is being carried by the user by being inserted into a back pack;

FIG. 6C is a diagram showing the waveform of an evaluation signal s computed on the basis of areas beneath the waveforms of the acceleration signals g while the portable electronic apparatus is being carried by the user by being inserted into a back pack;

FIG. 7A is a diagram showing the waveforms of acceleration signals g each output while the portable electronic apparatus is being carried by the user by hanging the apparatus from a strap;

FIG. 7B is a diagram showing the waveform of an evaluation signal J output while the portable electronic apparatus is being carried by the user by hanging the apparatus from a strap;

FIG. 7C is a diagram showing the waveform of an evaluation signal s computed on the basis of areas beneath the waveforms of the acceleration signals g while the portable electronic apparatus is being carried by the user by hanging the apparatus from a strap;

FIG. 8 is an explanatory diagram to be referred to in description of an operation to be carried out for a shake-count value equal to 0 in a process to detect a shake operation in accordance with the embodiment;

DETAILED DESCRIPTION OF THE PREFERRED EMBODIMENT

A preferred embodiment of the present invention is explained below by referring to diagrams (in the following description, the preferred embodiment of the present invention is referred to simply as an embodiment).

[External Appearance]

Figure 1:
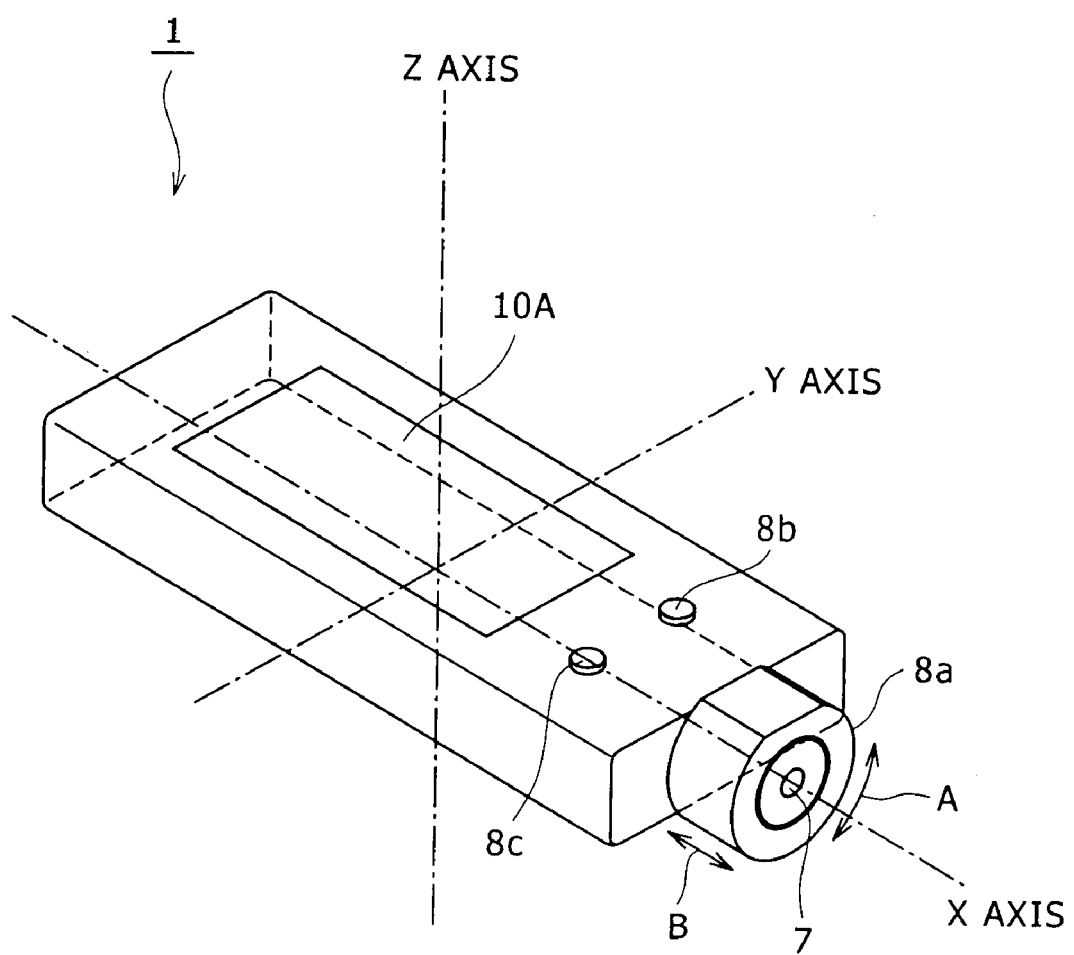
FIG. 1 is a perspective diagram showing a typical external appearance of a portable electronic apparatus according to an embodiment of the present invention.

FIG. 1 is a perspective diagram showing a typical external appearance of a portable content player 1 serving as a portable electronic apparatus according to an embodiment of the present invention. The portable content player 1 according to the embodiment has such a small size that the user is capable of carrying the player by for example making use of one hand so that the portable content player 1 can be utilized as a portable apparatus. As is obvious from the figure, the external appearance is the appearance of an approximately rectangular shape, which has six faces.

On one of the six external faces of such a portable content player 1, a display screen unit 10A is provided as shown in the figure. The display screen unit 10a is a unit for displaying necessary information according to the operation state of the portable content player 1. When the portable content player 1 is reproducing a content, for example, the display screen unit 10A displays the title of the content being reproduced and necessary information including primary representatives such as the reproduction lapse time in terms of characters and images.

In addition, the portable content player 1 also employs operation components to be operated physically by the user in order to give commands to the portable content player 1. The user operates the operation components by, for example, pressing or rotating the components. The operation components include key buttons 8b and 8c provided on the same face as the display screen unit 10A as well as a jog dial 8a attached to a face approximately perpendicular to the face on which the display screen unit 10A is provided. The jog dial 8a can be rotated typically over an angular range determined in advance in clockwise and counterclockwise directions indicated by a bent arrow A shown in the figure. In addition, the jog dial 8a can also be pushed toward the body of the portable content player 1 in an inward direction indicated by an arrow B shown in the figure or pulled out from the body of the portable content player 1 in an outward direction indicated by the same arrow B. In general, the key buttons 8b and 8c can be pushed and released. In the case of the portable content player 1 according to the embodiment, by operating these operation components, the user is capable of carrying out almost all operations to reproduce a content from the portable content player 1. As will be described later, however, the user is also capable of carrying out a special operation by shaking the portable content player 1 by using a hand without operating these operation components.

In addition, a headphone terminal 7 is provided on the inner side of the jog dial 8a. The sound of a content reproduced by the portable content player 1 is output by way of the headphone terminal 7.

[Internal Configuration of the Portable Electronic Apparatus]

Figure 2:
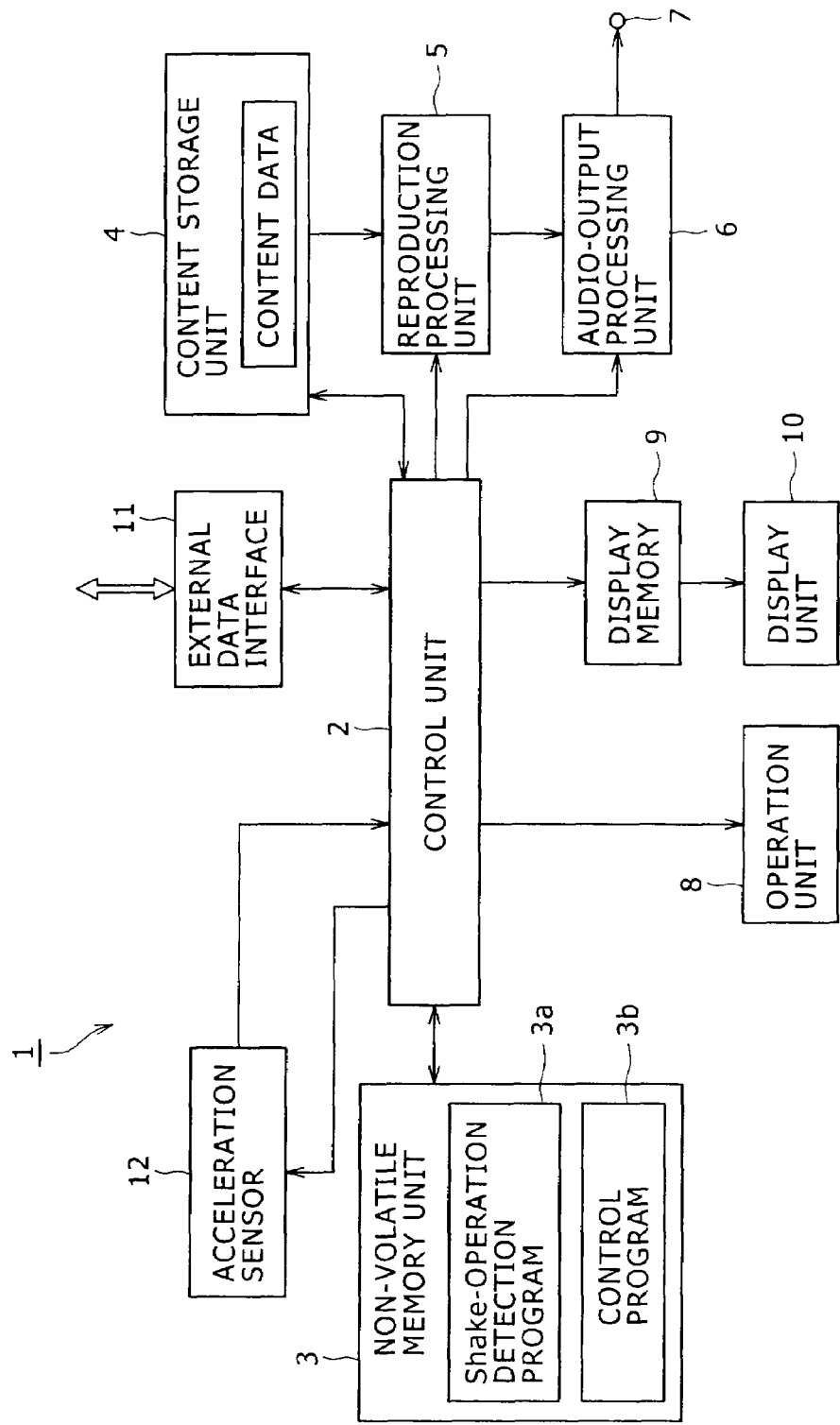
FIG. 2 is a block diagram showing a typical internal configuration of the portable electronic apparatus according to the embodiment of the present invention.

FIG. 2 is a block diagram showing a typical internal configuration of the portable content player 1 shown in FIG. 1. First of all, the control unit 2 has a microcomputer typically including a CPU (Central Processing Unit), a ROM (Read Only Memory) and a RAM (Random Access Memory) or the like. The control unit 2 is a unit for executing various kinds of control on the portable content player 1.

The nonvolatile memory unit 3 is a member for storing information. In general, the nonvolatile memory unit 3 is a semiconductor memory device capable of retaining the information stored therein even if no power is supplied thereto by a main power supply. Main examples of the nonvolatile memory unit 3 include a flash memory. In the case of the embodiment, information stored in the nonvolatile memory unit 3 includes a shake-operation detection program 3a and a control program 3b as shown in the figure. The shake-operation detection program 3a and the control program 3b are each a program to be executed by the CPU employed in the control unit 2. Details of the shake-operation detection program 3a and the control program 3b will be described later. It is to be noted that, even though the figure shows only the shake-operation detection program 3a and the control program 3b, which are each stored in the nonvolatile memory unit 3 as a program to be executed by the CPU employed in the control unit 2, as information stored in the nonvolatile memory unit 3, the nonvolatile memory unit 3 can also be used for storing other information such as various kinds of data. For example, the nonvolatile memory unit 3 can conceivably be used for storing, among others, set data to be used by the control unit 2 in execution of various kinds of control and management information.

The content storage unit 4 is a section for storing contents that can each be reproduced by the portable content player 1. The contents stored in advance in the content storage unit 4 are managed in file units. The present invention should not specially impose limitations on types of the contents stored in advance in the content storage unit 4 or the format of files each used as a unit for managing the contents. In order to simplify the explanation in the following description, however, the contents each stored in advance in the content storage unit 4 as an object of reproduction are each audio data (or musical data), which has been compressed in accordance a compression coding format determined in advance.

In addition, a storage medium employed in the portable content player 1 as the content storage unit 4 is not specially limited to a specific storage medium. That is to say, the content storage unit 4 can be any arbitrary storage medium as long as the actually used storage medium is a widely used contemporary medium such as an HDD (Hard Disk Drive) or a nonvolatile semiconductor memory device (such as a flash memory). In other words, the content storage unit 4 can be a storage medium known so far or being developed as a future medium. In addition, the portable content player 1 can have a configuration in which the content storage unit 4 is a storage medium embedded in the portable content player 1 as shown in the figure or a configuration in which a removable storage medium is used as the content storage unit 4. If a removable storage medium is used as the content storage unit 4, the portable content player 1 is provided with a drive for driving the removable storage medium. In addition, even though the nonvolatile memory unit 3 and the content storage unit 4 are employed in the portable content player 1 as functional blocks separated from each other as shown in FIG. 2, it is also possible to provide a configuration in which the nonvolatile memory unit 3 and the content storage unit 4 are physically combined into a common storage medium.

The external data interface 11 employed in the portable content player 1 according to the embodiment is a section for acquiring a content to be stored in advance in the content storage unit 4 from an external content source such as a personal computer serving as a host. That is to say, the portable content player 1 is connected to the host personal computer through the external data interface 11 so as to allow a content to be transferred from the personal computer to the portable content player 1. The portable content player 1 acquires the content from the personal computer in accordance with control executed by the control unit 2 and stores the acquired content in the content storage unit 4.

Each content acquired from an external content source can be put in a proper group in accordance with additional information attached to the content. For example, a content is handled in the external content source by including the content in an album. Contents pertaining to the same album each have the title of the album as additional information attached to each of the contents. In this case, the portable content player 1 stores such contents in the content storage unit 4 and puts the contents in a group corresponding to the album for the purpose of managing the contents. As another example, an external content source may generate a playlist serving as a list of selected contents. In this case, the portable content player 1 stores such contents in the content storage unit 4 and puts the contents in a group corresponding to the playlist. When the portable content player 1 receives a content from an external content source, the portable content player 1 puts the content in such a group, which can correspond to additional information or the like. In the following description, a group in which the portable content player 1 puts contents for the purpose of managing the contents is referred to as a folder.

The external data interface 11 has a configuration including hardware and software for carrying out communications with an external device through either of a cable and radio communication, which conform to a predetermined data communication standard. The data communication standard adopted by the portable content player 1 as a standard to which the cable or the radio communication conforms should not be prescribed specially. In the present state of the art, however, it is possible to conceivably adopt a data communication standard such as the IEEE (Institute of Electrical and Electronic Engineers) 1394, the USB (Universal Serial Bus), the Ethernet, the Bluetooth or the IEEE802.11a/b/g.

The reproduction processing unit 5 is a section for inputting a content read out from the content storage unit 4 and carrying out a necessary reproduction signal process on the content in accordance with control executed by the control unit 2. Since the content is a file of audio data completing a compression coding process according to a method determined in advance, the reproduction processing unit 5 carries out a demodulation process or the like according to the compression coding method an other processes on the content, and outputs the result of the reproduction signal process to the audio-output processing unit 6 as an audio signal. The audio-output processing unit 6 is a section for carrying out audio-signal processing, that has to be executed at a stage following the demodulation process, on the audio signal received from the reproduction processing unit 5. The audio-signal processing typically includes a process to adjust the quality of the sound, a process to adjust the volume of the sound and a process to amplify the audio signal. As a result of the audio-signal processing, the audio-output processing unit 6 outputs an audio signal for driving a headphone to the headphone terminal 7.

The display unit 10 is a display device having the display screen unit 10A included in the external appearance shown in FIG. 1 as the appearance of the portable content player 1. The display unit 10 displays various kinds of information on the display screen unit 10A. In an operation carried out by the display unit 10 to display an image on the display screen unit 10A, the control unit 2 stores the data of the image on the display memory 9 and controls the display unit 10 to carry out a display driving operation making use of the data stored in the display memory 9.

The operation unit 8 employs operation components and another member. Provided on outer faces of a case enclosing the portable content player 1, the operation components are the jog dial 8a and key buttons 8b and 8c. The other member is a unit for generating an operation command signal according to an operation carried out on any one of the operation components and outputting the operation command signal to the control unit 2. The control unit 2 carries out a necessary process according to the operation command signal received from the operation unit 8.

The acceleration sensor 12 is a sensing unit employed in the portable content player 1 according to the embodiment. The acceleration sensor 12 is a sensor capable of detecting accelerations generated in the directions of Y and Z axes of a coordinate system based on an X axis, the Y axis perpendicular to the X axis and the Z axis perpendicular to a plane on which both the X and Y axes are laid.

In the case of the embodiment, with the surface of the display screen unit 10A of the portable content player 1 taken as a reference, the three axes of the X, Y and Z axes are fixed axes as shown in FIG. 1. As shown in the figure, the Z axis is an axis perpendicular to the surface of the display screen unit 10A. On the other hand, the X axis is an axis perpendicular to a face on which the jog dial 8a is provided (that is, the face on which the jog dial 8a is provided is a face perpendicular to the surface of the display screen unit 10A). The Y axis is an axis perpendicular to a plane on which both the Z and X axes are laid.

Let us refer back to FIG. 2. The acceleration sensor 12 supplies a signal representing a result of detecting an acceleration generated in the direction of the Y axis and a signal representing a result of detecting an acceleration generated in the direction of the Z axis to the CPU employed in the control unit 2. In the following description, the a signal representing a result of detecting an acceleration generated in the direction of the Y axis is referred to as a Y-axis acceleration signal whereas the a signal representing a result of detecting an acceleration generated in the direction of the Z axis is referred to as a Z-axis acceleration signal.

The control unit 2 samples the Y-axis acceleration signal and the Z-axis acceleration signal, which are generated by the acceleration sensor 12, making use of the sampled signals in a process to be described later as a process to detect a shake operation.

[Shake Operation]

In the portable content player 1 according to the embodiment having the configuration described above, in addition to the ordinary operations carried out on the operation unit 8 serving as operation components, a shake operation to shake the portable content player 1 can be carried out deliberately by the user without performing the ordinary operations on the operation unit 8. The shake operation is carried out by the user in order to drive the portable content player 1 to perform predetermined operations. The shake operation used in the following description is defined as an operation to shake the portable content player 1 in order to drive the portable content player 1 to carry out predetermined operations.

Figure 3:
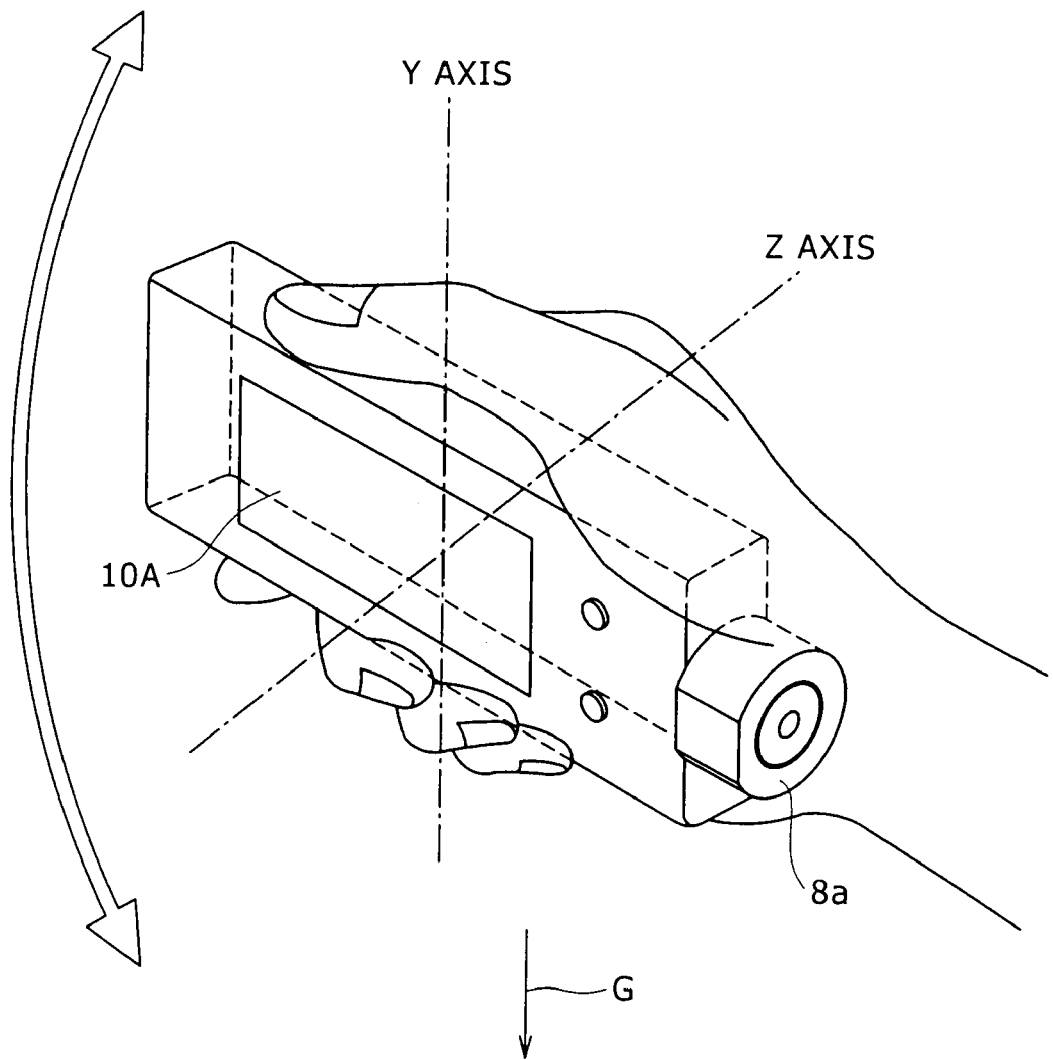
FIG. 3 is an explanatory diagram to be referred to in description of a shake operation.

FIG. 3 is an explanatory diagram to be referred to in description of a typical shake operation defined above. A direction indicated by an arrow G shown in the figure is the gravitational direction whereas a plane perpendicular to the arrow G is a horizontal plane. As shown in the figure, in order to carry out a shake operation, the portable content player 1 has to be held in an orientation that sets the surface of the display screen unit 10A in parallel to the gravitational direction. The orientation that sets the surface of the display screen unit 10A in parallel to the gravitational direction is an orientation perpendicular to the horizontal plane. With the portable content player 1 oriented as described above, a shake operation is carried out by shaking the portable content player 1 up and down in the direction of the Y axis as indicated by a double-line arrow shown in the figure. As described above, a shake operation is an operation to shake the held portable content player 1 in the direction of an axis determined in advance. To put it more concretely, a shake operation is like an operation to apply a hand force to a mercury thermometer instantaneously in order to reset a temperature indicated by the thermometer.

In accordance with such a typical shake operation, the portable content player 1 makes back-and-forth motions in the direction of the Y axis. To put it concretely, in the shake operation, the portable content player 1 moves upward and downward in the gravitational direction and, by moving in both the up and down directions, the portable content player 1 makes back-and-forth motions in the direction of a predetermined axis, which is the Y axis in this example.

It is to be noted that, even though the typical shake operation described above is a shake operation carried out in the direction of the Y axis, in the portable content player 1 according to the embodiment, the acceleration sensor 12 also detects the acceleration of the Z axis as well. As will be described later, the embodiment is made capable of producing a result of determination as to whether or not a shake operation is being carried out by taking the accelerations made in the directions of these two axes into consideration. Thus, the shake operation can be carried out in not only the direction of the Y axis, but also the direction of the Z axis.

[Generation of an Evaluation Signal]

By the way, if a specific movement is taken into consideration as a movement made by a portable electronic apparatus (for example, impacts corresponding to walking, running, or falling) while the apparatus is being used in an attempt to detect a predetermined movement made by the apparatus as a movement different from the specific movement by making use of an acceleration sensor as described above, incorrect detection of the predetermined movement becomes a problem. In order to avoid such a problem, the embodiment detects a shake operation by adoption of the following technique.

First of all, in the embodiment, the Y-axis acceleration signal and the Z-axis acceleration signal, which are generated by the acceleration sensor 12, are not used as they are in a process to detect a shake operation. Instead, the Y-axis acceleration signal and the Z-axis acceleration signal are subjected to a predetermined process in order to generate an evaluation signal, which is used for detecting the shake operation. A technique adopted by the embodiment to generate an evaluation signal is explained as follows.

As also explained earlier by referring to FIG. 2, first of all, the Y-axis acceleration signal and the Z-axis acceleration signal, which are generated by the acceleration sensor 12, are supplied to the control unit 2. The control unit 2 samples the Y-axis acceleration signal and the Z-axis acceleration signal at intervals determined in advance. On the basis of values sampled from the Y-axis acceleration signal and the Z-axis acceleration signal, the control unit 2 generates an evaluation signal J representing the net amplitude of the acceleration signals generated by the acceleration sensor 12 in the portable content player 1 and the net polarity of the acceleration signals. The polarity of an acceleration signal may be a positive or negative polarity.

As a rough concept, the evaluation signal J may be considered as a signal obtained by subtracting an average from a sum. The sum is the sum of the absolute values of values obtained by sampling the Y-axis acceleration signal and the Z-axis acceleration signal for the present sampling timing. On the other hand, the average is the average value of such sums each obtained with one of a plurality of sampling times in the past period determined in advance. That is to say, let notation norm denote the sum of the absolute values of values obtained by sampling the Y-axis acceleration signal and the Z-axis acceleration signal for the present sampling timing whereas notation ag denote the average of such sums norm each computed with one of sampling timings in the past period determined in advance. In this case, the evaluation signal J is generated as a signal satisfying the following equation:

$$J = \text{norm} - ag$$

To put it concretely, the control unit 2 computes the absolute values of values sampled with the present sampling timing from the Y-axis acceleration signal and the Z-axis acceleration signal, which are generated by the acceleration sensor 12, are supplied to the control unit 2. Then, norm is computed by finding the sum of the absolute values. By subtracting the average ag from the sum norm, the evaluation signal J can be found. By the way, ag is the average of such sums each computed with a sampling time in the past period determined in advance. Thus, when the sum norm for the present timing is computed, the sums each computed for a sampling time in the past period determined in advance have already been known. The average ag is found by taking an average of the sums each computed with a sampling time in the past period determined in advance. Then, the control unit 2 subtracts the average ag from the sum norm in order to find an evaluation signal J for the present timing. The operation to subtract the average ag from the sum norm in order to find an evaluation signal J is carried out with every timing.

It is to be noted that the absolute value of an original value is a value representing the absolute quantity of the original value. (In the above description, the original value is a value sampled from an acceleration signal.) In actuality, the square of an original value may be used as a substitute for the absolute value of the original value.

FIG. 4A is a diagram showing the waveforms of acceleration signals g each output by an acceleration sensor employed in the portable electronic apparatus. On the other hand, FIG. 4B is a diagram showing the waveform of an evaluation signal J as a waveform to be compared with the waveforms of the acceleration signals. In FIG. 4A, the waveform of the Y-axis acceleration signal g is drawn as a solid line whereas the waveform of the Z-axis acceleration signal g is drawn as a dashed line. As described above, the control unit 2 finds the evaluation signal J by subtracting an average ag of sums of the absolute values of values obtained by sampling the Y-axis acceleration signal and the Z-axis acceleration signal with sampling timings in the past period determined in advance from the sum norm of the absolute values of values obtained by sampling the Y-axis acceleration signal g and the Z-axis acceleration signal g with the present sampling timing. Thus, the evaluation signal J represents the net amplitude of the acceleration signals g generated by the acceleration sensor 12 in the portable content player 1 and the net polarity of the acceleration signals g. The polarity of an acceleration signal may be a positive or negative polarity. (The average ag of sums of the absolute values can be regarded as an average acceleration signal.)

FIGS. 5A to 5C are diagrams showing the waveforms of acceleration signals in a shake operation. FIGS. 6A to 6C are diagrams showing the waveforms of acceleration signals when the portable electronic apparatus is carried by the user by inserting the apparatus into a back pack. FIGS. 7A to 7C are diagrams showing the waveforms of acceleration signals each output when the portable electronic apparatus is carried by the user by hanging the apparatus from a strap. In FIGS. 5A, 6A and 7A, the waveform of the Y-axis acceleration signal g is drawn as a solid line whereas the waveform of the Z-axis acceleration signal g is drawn as a dashed line. The waveform of an evaluation signal s shown in each of FIGS. 5C, 6C and 7C is a waveform to be compared with the waveform of an evaluation signal s shown in each of FIGS. 5B, 6B and 7B respectively. It is to be noted that the waveform area for computing the evaluation signal s shown in each of FIGS. 5C, 6C and 7C is found by computing the difference between the present sampled value of an acceleration signal for an axis determined in advance and a sampled value immediately leading ahead of the present sampled value and finding the sum of such differences computed over a predetermined period of time. (In this case, the axis determined in advance is the Y axis.) Such an area is found for every sampling timing.

In the first place, as is obvious from FIG. 5, the waveform of the evaluation signal J shown in FIG. 5B represents the amplitudes of the acceleration signals g shown in FIG. 5A as acceleration signals generated in a shake operation. In addition, in the case of a shake operation, the waveform of the evaluation signal J exhibits positive and negative polarities according to positive and negative polarities exhibited by the waveforms of the acceleration signals g as polarities caused by back-and-forth motions of the shake operation. The waveform of the evaluation signal s computed on the basis of areas beneath the waveforms of the acceleration signals as shown in FIG. 5C also well follows the back-and-forth motions of the shake operation. (In the case of the examples shown in FIG. 5, there are three couples of back-and-forth motions of the shake operation.)

Also, as is obvious from FIG. 6, the waveform of the evaluation signal J shown in FIG. 6B represents the amplitudes of the acceleration signals g shown in FIG. 6A as acceleration signals generated when the portable electronic apparatus is carried by the user by being inserted into a back pack. In comparison with the waveform of the evaluation signal J shown in FIG. 5B as a signal generated in a shake operation, the waveform of the evaluation signal J shown in FIG. 6B as a signal exhibiting positive and negative polarities is shifted as a whole in a direction toward one of the polarities by an offset from the 0 level serving as the center of the polarities. Furthermore, as is obvious from FIG. 7, on the other hand, the waveform of the evaluation signal J shown in FIG. 7B represents the amplitudes of the acceleration signals g shown in FIG. 7A as acceleration signals generated when the portable electronic apparatus is carried by the user by being hung from a strap. By the same token, in comparison with the waveform of the evaluation signal J shown in FIG. 5B as a signal generated in a shake operation, the waveform of the evaluation signal J shown in FIG. 7B as a signal exhibiting positive and negative polarities is shifted as a whole in a direction toward one of the polarities by an offset from the 0 level serving as the center of the polarities.

As is obvious from experiment results shown in FIGS. 5 to 7, the waveform of the evaluation signal J according to the embodiment exhibits positive and negative polarities according to back-and-forth motions made by the portable electronic apparatus when a shake operation is carried out on the portable electronic apparatus. It can be understood that the evaluation signal J shown in FIG. 5B is a signal suitable for detection of a shake operation.

The following explanation confirms what has been described above. The waveform of the evaluation signal J according to the present embodiment is a waveform exhibiting positive and negative polarities according to positive and negative polarities exhibited by the waveforms of the acceleration signals g as polarities according to back-and-forth motions of a shake operation. Thus, the possibility that a shake operation is detected incorrectly by making use of this evaluation signal J is low in comparison with the use of the evaluation signal s computed on the basis of areas beneath the waveforms of the acceleration signals g as shown in FIG. 5C. That is to say, since the evaluation signal s does not exhibit positive and negative polarities, it is feared that a shake operation is undesirably detected even though the back-and-forth motions accompanying the shake operation are not made normally.

In addition, as described above, the evaluation signal J according to the embodiment is obtained by subtracting an average ag of sums of the absolute values of values obtained by sampling the Y-axis acceleration signal and the Z-axis acceleration signal with sampling timings in the past period determined in advance from the sum of the absolute values of values obtained by sampling the Y-axis acceleration signal and the Z-axis acceleration signal with the present sampling timing. Thus, the evaluation signal J has a merit that unnecessary offset components generated in the acceleration signals g can be eliminated. In general, the acceleration sensor 12 for generating the Y-axis acceleration signal and the Z-axis acceleration signal is calibrated typically at the time the portable content player 1 is shipped from the factory before the portable content player 1 is utilized by the user in the field. Since the evaluation signal J has a merit that unnecessary offset components can be eliminated, however, the calibration process can be omitted. In addition, even if the acceleration sensor 12 is calibrated, more and more offset components are undesirably superposed on the acceleration signals g with the lapse of time. Thus, by making use of the evaluation signal J in detection of a shake operation, incorrect detection of the shake operation can be avoided.

[Shake-Operation Detection Using the Evaluation Signal J]

By referring to FIGS. 8 to 1, the following description explains a concrete technique for detecting a shake operation by making use of the evaluation signal J. FIG. 8 is an explanatory diagram to be referred to in description of an operation to be carried out for a shake-count value equal to 0 in a process to detect a shake operation in accordance with the embodiment. It is to be noted that operations explained by referring to FIGS. 8 to 11 are carried out by the CPU employed in the control unit 2. The value of a shake count is a result of a counting operation carried out by the CPU employed in the control unit 2. As will be obvious from later description, completion of execution of a shake operation is confirmed when the shake count reaches a value determined in advance.

Let us pay attention to a mountain appearing between 0-cross timings of the waveform of an evaluation signal J as a mountain of the waveform as shown in FIG. 8 in a process to detect a shake operation. If the mountain appearing between 0-cross timings of an evaluation signal J as a mountain of the waveform of the evaluation signal J satisfies conditions determined in advance, the value of the shake count is set at 1 to indicate that a first valid mountain has been detected. The conditions include condition <1> shown in the figure as a condition requiring that the length of a period sandwiched between the 0-cross timings as the period of the mountain shall be a value in a range determined in advance. To put it in detail, condition <1> may require that the length of a period indicated by dashed-line arrows in the figure as the period of the mountain between the 0-cross timings of the evaluation signal J shall be a value in a range between predetermined threshold values zcrs1 and zcrs2 not shown in the figure. (The period between the 0-cross timings corresponds to a 0-cross interval count value to be described later.) The conditions also include condition <2> shown in the figure as a condition that the peak value of the mountain shall be a value in the range between threshold values determined in advance. To put it in detail, condition <2> may require that (the absolute value of) a maximum value indicated by a solid-line arrow in the figure as the maximum value of the waveform of the evaluation signal J formed in the period between the 0-cross timings shall be a value in a range between predetermined threshold values max1 and max2 not shown in the figure. If the mountain appears between the 0-cross timings of an evaluation signal J as a mountain of the waveform of the evaluation signal J and satisfies conditions <1> and <2> described above, first of all, the value of the shake count is set at 1 to indicate that one of back-and-forth motions accompanying a shake operation has been made.

Figure 9:
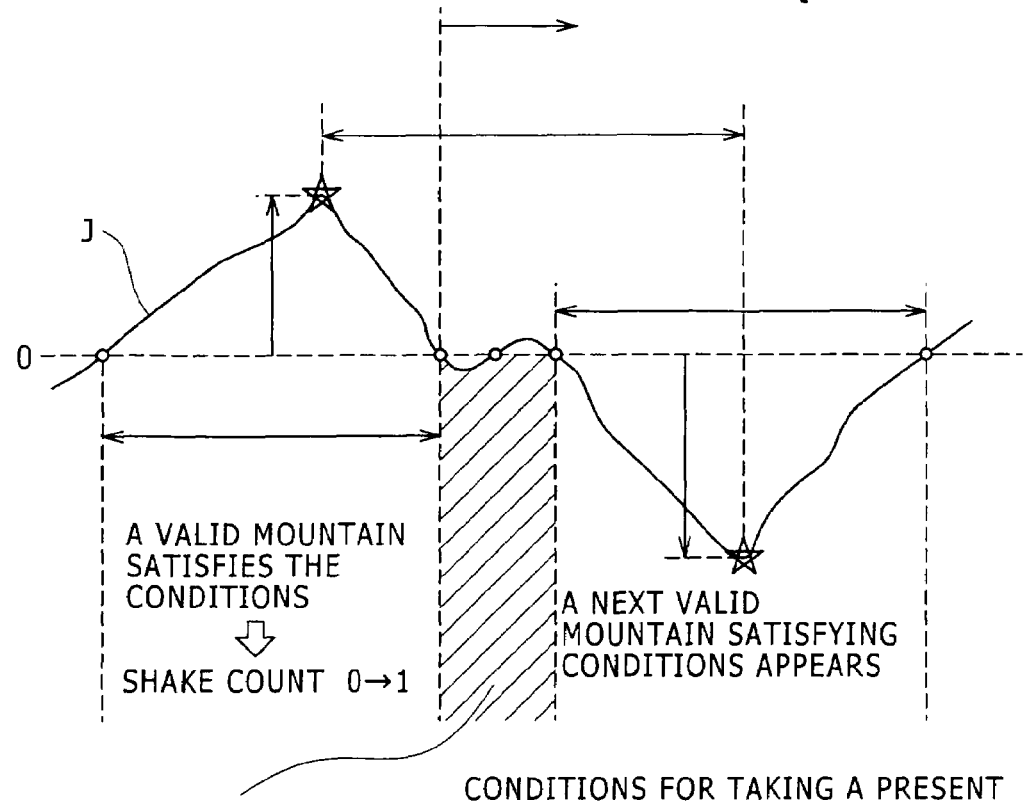
FIG. 9 is an explanatory diagram to be referred to in description of an operation to be carried out for the shake-count value at least equal to 1 in a process to detect a shake operation in accordance with the embodiment.

FIG. 9 is an explanatory diagram to be referred to in description of an operation to be carried out for the shake-count value at least equal to 1. First of all, even after the value of the shake count is changed from 0 to 1 when a first mountain satisfying the conditions described above appears as shown in FIG. 8, as shown in FIG. 9, another mountain appearing between the 0-cross timings of an evaluation signal J as a mountain of the waveform of the evaluation signal J is examined in order to produce a result of determination as to whether or not the other mountain satisfies the condition. That is to say, the other mountain is examined in order to produce a result of determination as to whether or not the length of the period between the 0-cross timings has a value in the range sandwiched by the threshold values zcrs1 and zcrs2 determined in advance and the peak value is a value in the range sandwiched by the threshold values max 1 and max2 determined in advance. In other words, the other mountain is examined in order to produce a result of determination as to whether the mountain is valid or invalid.

A mountain may appear in a period corresponding to a block hatched with slanting parallel lines as shown in FIG. 9. Such a mountain does not satisfy the conditions described by referring to FIG. 8 and is thus regarded as an invalid mountain, which is ignored for the present. In this case, the value of the shake count is sustained at the present value as it is.

Then, when a next mountain satisfying the conditions for a valid mountain appears, the next mountain is examined in order to produce a result of determination as to whether or not the previous mountain satisfying the conditions and the next mountain are consecutive valid mountains appearing in a row. That is to say, the production of the result of the determination is an attempt to set other conditions that, after the first one of back-and-forth motions caused by a shake operation is detected, the other back-and-forth motion following the first back-and-forth motion shall be detected.

In other words, while the conditions described above are conditions that a single mountain shall be a valid mountain, the other conditions are conditions that two consecutive mountains shall be valid mountains appearing in a row. To put it concretely, first of all, successive positive and negative peak values of the two consecutive mountains shall be alternately detected and a difference in appearance timing between the positive and negative peak values shall be a value in a range determined in advance as shown in conditions <1> and <2> of FIG. 9. In condition <1>, the polarity the peak value of the previous valid mountain is compared with the polarity of that the peak value of the present valid mountain in order to produce a result of determination as to whether or not the peak value of the previous valid mountain has a polarity opposite to the polarity of the peak value of the present valid mountain. On the other hand, in condition <2>, a difference in appearance timing between the positive and negative peak values shall be a value in a range sandwiched by predetermined threshold values ts1 and ts2. In the figure, for example, the range sandwiched by the threshold values ts1 and ts2 determined in advance is a range indicated dotted/dashed-line arrows.

If the conditions <1> and <2> are satisfied and two consecutive positive and negative peak values are alternately detected, the value of the shake count is incremented by 1 (+1). That is to say, only if two consecutive alternating mountains satisfying conditions <1> and <2> as described above are detected, does the value of the shake count become at least equal to 2. The detection of such two consecutive mountains indicates that a back-and-forth motions have been made as a result of a shake operation. In other words, the value of the shake count is made at least equal to 2 because a result of determination indicates that a back-and-forth motions have been made as a result of a shake operation.

Basically, if a next mountain satisfying conditions <1> and <2> shown in FIG. 8 appears thereafter, conditions <1> and <2> shown in FIG. 9 are tested in order to produce a result of determination as to whether or not the appearing mountain and a mountain immediately preceding the appearing mountain are detected as consecutive valid mountains. If the result of the determination indicates that the appearing mountain and the immediately preceding mountain are detected as consecutive valid mountains satisfying conditions <1> and <2> shown in FIG. 9, the value of the shake count is incremented by 1 (+1). Then, as the shake count reaches a value determined in advance, completion of execution of a shake operation is confirmed. That is to say, if two consecutive alternating mountains are detected as a couple of mountains indicating a couple of back-and-forth motions caused by a shake operation and the number of such consecutive-alternating-mountain couples is at least equal than the value determined in advance, the existence of a shake operation is determined.

As described above, in the embodiment, the conditions for a previous valid mountain and a present valid mountain to be regarded as two consecutive mountains (that is, the conditions for completion of execution of two back-and-forth motions) are a condition that the two mountains shall have peak values with positive and negative polarities and a condition that a difference in timing between the two peak values shall be a value in a range determined in advance. If the condition that the two mountains shall have peak values with positive and negative polarities is not satisfied, the non-existence is determined. In this case, the value of the shake count is not reset immediately. Instead, deferment processing to be explained below by referring to FIG. 10 is carried out.

Figure 10:
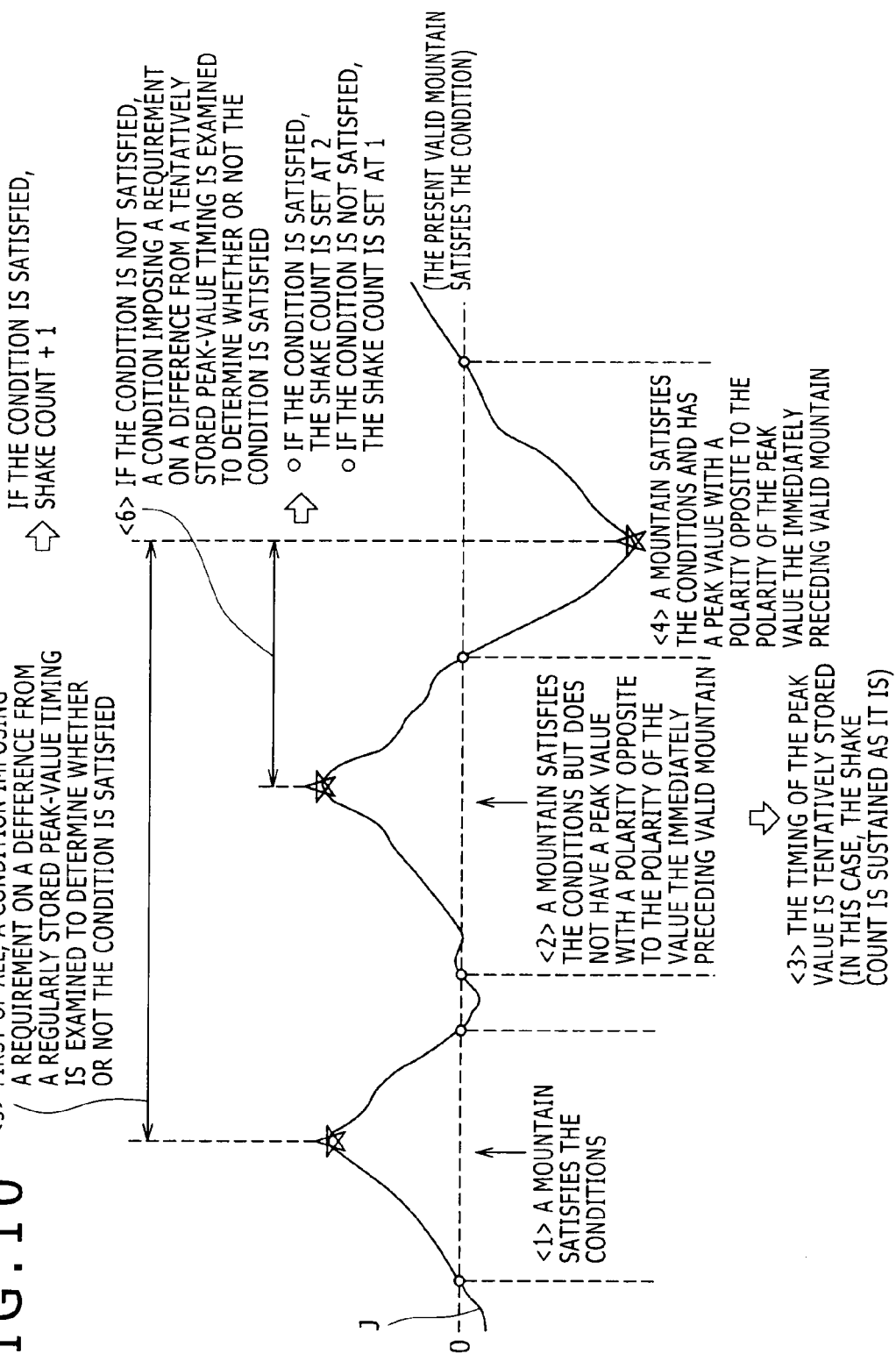
FIG. 10 is an explanatory diagram to be referred to in description of deferment processing to be carried out as a process to detect a shake operation in accordance with the embodiment.

FIG. 10 is an explanatory diagram to be referred to in description of deferment processing to be carried out if the condition that the two mountains shall have peak values with positive and negative polarities is not satisfied. First of all, notation <1> shown in FIG. 10 denotes a first mountain that satisfies the conditions described earlier by referring to FIG. 8. In this case, the value of the shake count is set at 1. Then, a next mountain <2> appears after the mountain <1>. As shown in the figure, however, the condition that the 2 mountains <1> and <2> shall have peak values with positive and negative polarities is not satisfied.

In this case, the timing of the peak value of the mountain <2>, which does not satisfy the condition that the two mountains <1> and <2> shall have peak values with positive and negative polarities, is saved tentatively in a process denoted by reference numeral <3>. In addition, the value of the shake count is sustained as it is. Thus, for the mountain <2>, which does not satisfy the condition that the two mountains <1> and <2> shall have peak values with positive and negative polarities, condition <2> shown in FIG. 9 is not examined in order to produce a result of determination whether or not continuity exists between the mountain <1> immediately leading ahead of the mountain <2> and the mountain <2> for the present.

Then, a next mountain <4> appears after the mountain <2>. The mountain <4> satisfies the condition that the two mountains <2> and <4> shall have peak values with positive and negative polarities. To be more specific, the polarity of the peak value of the mountain <2>, the timing of which has been saved tentatively, is positive while the polarity of the peak value of the mountain <4> appearing presently is negative. In this case, the condition related to the timing saved regularly as the timing of the peak value of the regular mountain <1> is examined in order to produce a result of determination whether or not the condition is satisfied in a process denoted by reference numeral <5>. That is to say, the timing of the peak value of the mountain <4> satisfying the condition that the two mountains <1> and <4> shall have peak values with positive and negative polarities is examined in order to produce a result of determination as to whether or not the difference between the timing saved regularly as the timing of the peak value of the regular mountain <1> and the timing of the peak value of the mountain <4> has a value in a range determined in advance, that is, whether or not the previous regular mountain <1> and the present mountain <4> are two consecutive valid mountains. If the result of the determination carried out in the process <5> indicates that the previous regular mountain <1> and the present mountain <4> are two consecutive valid mountains, the value of the shake count is incremented by 1 (+1) to show that these two mountains are caused by a back-and-forth motions resulting from a shake operation.

If the result of the determination carried out in the process <5> indicates that the previous regular mountain <1> and the present mountain <4> are not two consecutive valid mountains, on the other hand, the condition related to the timing saved tentatively as the timing of the peak value of the mountain <2> is examined in order to produce a result of determination whether or not the condition is satisfied in a process denoted by reference numeral <6>. That is to say, whether or not the difference between the timing saved tentatively as the timing of the peak value of the mountain <2> and the timing of the peak value of the mountain <4> has a value in the range determined in advance is examined. If the result of the determination carried out in the process <6> indicates that the immediately preceding regular mountain <2> and the present mountain <4> are two consecutive valid mountains, the value of the shake count is set at 2. That is to say, since the previous regular mountain <1> and the present mountain <4> are not two consecutive valid mountains, the value of the shake count is not incremented. Since the immediately preceding mountain <2> and the present mountain <4> are two consecutive valid mountains, however, the value of the shake count is set at 2.

If the result of the determination carried out in the process <6> indicates that the difference between the timing saved tentatively as the timing of the peak value of the mountain <2> and the timing of the peak value of the mountain <4> has a value not in the range determined in advance, implying that the tentatively assumed immediately preceding mountain <2> and the present mountain <4> are not two consecutive valid mountains, on the other hand, the value of the shake count is set at 1. That is to say, since the previous regular mountain <1> and the present mountain <4> are not two consecutive valid mountains and the tentatively assumed immediately preceding mountain <2> and the present mountain <4> are not two consecutive valid mountains either, the value of the shake count is set at 1. For the purpose of confirmation, the value of the shake count is set at 1 because the mountain <4> itself is a valid mountain satisfying the conditions shown in FIG. 8.

As described above by referring to FIG. 10, after the regular valid mountain <1> satisfying the conditions described earlier by referring to FIG. 8 appears, the valid mountain <2> not satisfying condition <1> shown in FIG. 9 as a condition that the two mountains <1> and <2> shall have peak values with positive and negative polarities appears. In this case, the timing of the peak value of the mountain <2> is saved tentatively without testing condition <2> shown in FIG. 9 as a condition for continuity between the mountain <2> and the mountain <1>. Then, when the regular valid mountain <4> satisfying condition <1> shown in FIG. 9 as a condition that the two mountains <2> and <4> shall have peak values with positive and negative polarities appears, condition <2> shown in FIG. 9 as a condition for continuity between the mountains <1> and <4> is examined in order to produce a result of determination whether or not condition <2> is satisfied. If the condition for continuity between the mountains <1> and <4> is not satisfied, the tentatively saved timing of the peak value of the mountain <2> is utilized and the condition for continuity between the mountains <2> and <4> is examined in order to produce a result of determination as to whether or not the condition is satisfied.

By carrying out the deferment processing as described above, even if consecutive valid mountains <1> and <2> having peak values of the same polarity are detected for some reasons, the next mountain <4> may have a peak value of the polarity opposite to the same polarity of the two preceding mountains <1> and <2>. In this case, condition <2> for the continuity can be examined. In the past, there was a problem that when consecutive valid mountains <1> and <2> having peak values of the same polarity were detected for some reasons, the value of the shake count was reset even if the continuity between the valid mountains <1> and <2> have been confirmed. By carrying out the deferment processing as described above, however, the problem can be avoided.

Figures 11A, 11B:
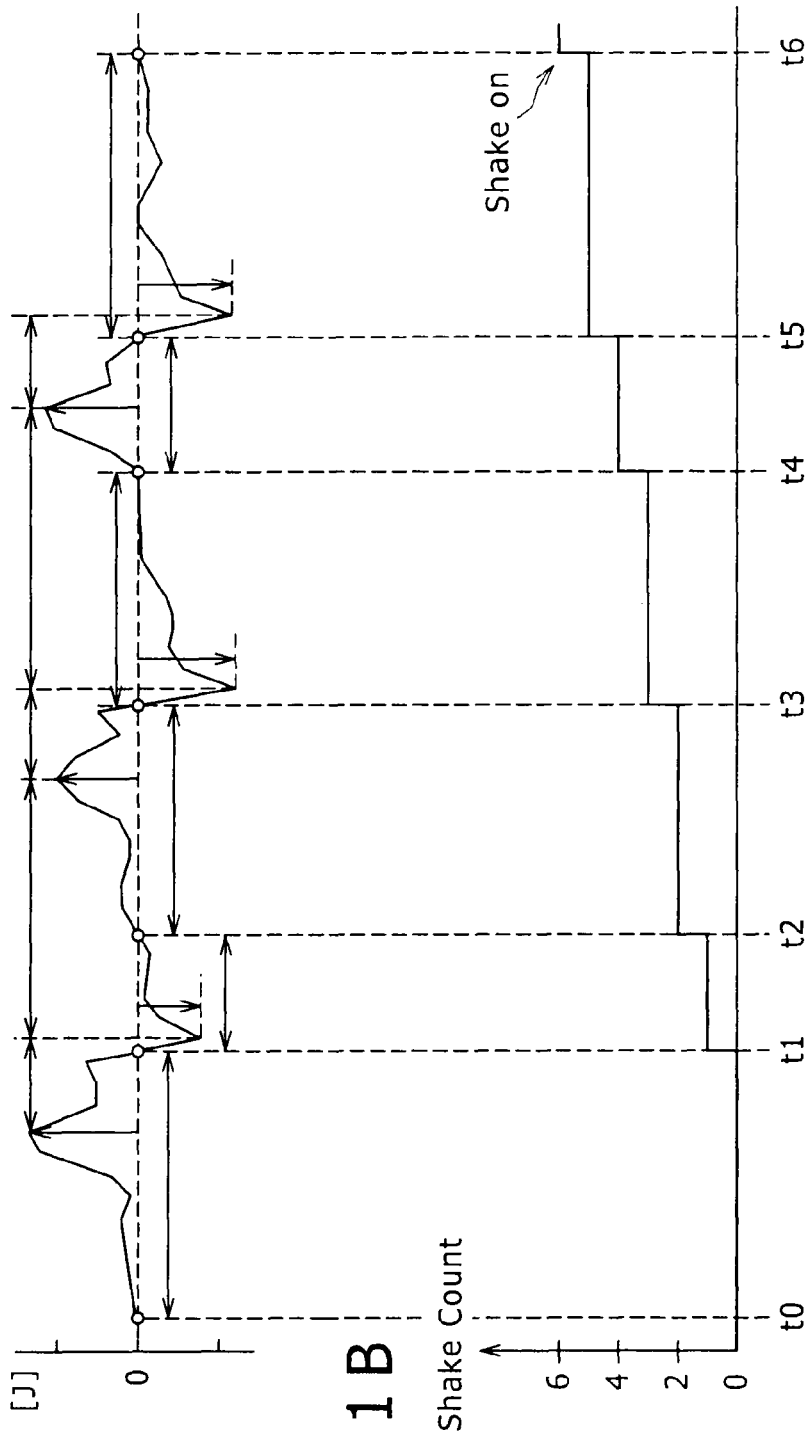
FIG. 11A is a diagram showing a typical waveform of the evaluation signal J output in a shake operation.
FIG. 11B is a diagram showing shake-count value changes accompanying the waveform shown in FIG. 11A.

In order to confirm what has been described above, FIG. 11A is given as a diagram showing a typical waveform of the evaluation signal J computed in a shake operation. On the other hand, FIG. 11B is given as a diagram showing shake-count value changes accompanying the waveform. First of all, in this embodiment, let us assume that a shake operation is defined as an operation resulting in three successive pairs of back-forth motions made consecutively along the time axis. In conformity with this definition, in the portable content player 1, completion of execution of a shake operation is confirmed when the value of the shake count reaches '6' corresponding to the three successive pairs of back-forth motions.

As is obvious from the descriptions given so far, in the processing to detect a shake operation as shown in FIG. 11, first of all, a basic process is carried out to produce a result of determination as to whether or not a mountain appearing between 0 crosses as a mountain of the evaluation signal J is a valid mountain by testing conditions <1> and <2> shown in FIG. 8. In this case, let us pay attention to the process of producing a result of determination as to whether or not a mountain appearing between 0 crosses as a mountain of the evaluation signal J is a valid mountain by testing conditions <1> and <2> shown in FIG. 8. Thus, the process of producing a result of determination as to whether or not a mountain appearing between 0 crosses is a valid mountain is always carried out with a 0-cross timing. That is to say, the length of the period sandwiched between the 0-cross timings (or the length of an interval between the 0-cross timings) is naturally unknown unless the 0-cross timings themselves are detected. In addition, the largest value among values between the 0-cross timings may not be confirmed as the peak value of the mountain unless the 0-cross timings themselves are detected.

In addition, after a valid mountain is detected and the shake count is incremented to a value at least equal to 1, as described earlier by referring to FIG. 9, the polarity of the peak value of the next detected valid mountain is examined in order to produce a result of determination as to whether or not the polarity is opposite to the polarity of the peak value of the immediately preceding valid mountain. In addition, the difference in peak-value timing between the immediately preceding valid mountain and the next detected valid mountain is examined in order to produce a result of determination as to whether or not the difference has a value within a range determined in advance, that is, in order to produce a result of determination as to whether or not continuity exists between the next detected valid mountain and the immediately preceding valid mountain. Also in this case, it is not until the detection of the 0-cross timings that the peak values and the peak-value timings are known. Thus, a process is carried out with the 0-cross timing as the process of producing a result of determination as to whether or not continuity exists between the next detected valid mountain and the immediately preceding valid mountain.

With the above descriptions taken into consideration, a mountain appearing in a 0-cross period between times t0 and t1 shown in FIGS. 11A and 11B is examined with the 0-cross timing at the time t1 in order to produce a result of determination as to whether the mountain is a valid or invalid mountain. If the result of the determination indicates that the mountain appearing in the 0-cross period between the times t0 and t1 is a valid mountain, the value of the shake count is incremented from the present value of '0' to '1'.

By the same token, a mountain appearing in a 0-cross period between times t1 and t2 shown in FIGS. 11A and 11B is examined with the 0-cross timing at the time t2 in order to produce a result of determination as to whether the mountain is a valid or invalid mountain. If the result of the determination indicates that the mountain appearing in the 0-cross period between the times t1 and t2 is a valid mountain, the difference in peak-value timing between the mountain appearing in the 0-cross period between the times t0 and t1 and the mountain appearing in the 0-cross period between the times t1 and t2 is examined with the 0-cross timing at the time t2 in order to produce a result of determination as to whether continuity exists between the two mountains. This is because the shake count has reached a value at least equal to '1'. If the result of the determination indicates that continuity exists between the two mountains, the value of the shake count is incremented by 1 (+1). That is to say, the value of the shake count is incremented from '1' to '2' at the time t2.

Thereafter, in the same way, with each of the 0-cross timings at times t3, t4, t5 and t6, a process is carried out to produce a result of determination as to whether a mountain immediately preceding the 0-cross timing is a valid or invalid mountain and, if the result of the determination indicates that the mountain is a valid mountain, a process is carried out to produce a result of determination as to whether or not continuity exists between the mountain and a mountain immediately preceding the mountain. If the result of the determination indicates that continuity exists between the two mountains, the value of the shake count is incremented by 1 (+1). If a valid mountain appears in a period of time between every two consecutive 0-cross timings as shown in the figure and continuity exists between every 2 successive valid mountains, the value of the shake count is sequentially incremented by '1' and at the time t6 value of the shake count is '6'. As the value of the shake count become '6', completion of execution of a shake operation is confirmed. In the following description, the operation to confirm the completion state of execution of a shake operation is referred to as a 'shake-on' action.

As a shake-on action is taken as described above, the control unit 2 resets the value of the shake count to 0. In addition, the control unit 2 takes a predetermined period of time following the shake-on action as a shake-on prevention interval for preventing a shake-on action from being taken again. By setting such a shake-on prevention interval after a shake-on action in this way, it is possible to prevent a shake operation from being detected frequently during a short period of time and, for example, prevent a reproduction mode to be described later from being switched many times during the shake-on prevention interval.

It is to be noted that, for the sake of the explanation convenience, the processes to produce a result of determination as to whether a mountain is valid or invalid and whether or not a continuity exists between the present valid mountain and an immediately preceding valid mountain are each carried out with a 0-cross timing. In accordance with the present invention, however, the value of the evaluation signal J is computed with a sampling timing. Thus, it is not necessarily possible to detect a 0-cross timing. For this reason, in actuality, a timing between two consecutive sampling timings with which the values of the evaluation signal J have different polarities is taken as a 0-cross timing. Even if a timing between two consecutive sampling timings with which the values of the evaluation signal J have different polarities is taken as a 0-cross timing, however, the operation to take such a timing as a 0-cross timing is essentially equivalent to an operation to detect a 0-cross timing. For this reason, a timing between two consecutive sampling timings with which the values of the evaluation signal J have different polarities is taken as a 0-cross timing.

As described above, in the embodiment, on the basis of restrictive validity conditions set for the width and amplitude of a mountain appearing on the waveform of an evaluation signal J, it is possible to produce a result of determination as to whether the mountain is a valid or invalid mountain, that is, whether or not one of 2 back-and-forth motions caused by shake operation has been made.

In addition, as a positive/negative polarity condition, the polarity of the peak value of a newly appearing valid mountain satisfying the restrictive validity conditions is examined in order to produce a result of determination as to whether or not the polarity is opposite to the polarity of the peak value of the immediately preceding valid mountain, that is, whether or not the polarity of the peak value of the newly appearing valid mountain is positive whereas the polarity of the peak value of the immediately preceding valid mountain is negative, or vice versa. Then, in addition to the positive/negative polarity condition, as a time-wise restrictive condition, the difference in timing between the polarity of the peak value of the newly appearing valid mountain and the peak value of the immediately preceding valid mountain is examined in order to produce a result of determination as to whether or not the difference has a value in a range determined in advance. Then, on the basis of results of testing the positive/negative polarity condition and the time-wise restrictive condition, it is possible to produce a result of determination as to whether or not a couple of back-and-forth motions caused by a shake operation have been made.

As described above, on the basis of restrictive validity conditions set for the width and amplitude of a mountain appearing on the waveform of an evaluation signal J, it is possible to produce a result of determination as to whether or not one of back-and-forth motions has been made. Then, on the basis of the validity of a mountain, it is possible to properly exclude a waveform not assumed to be a waveform indicating a movement caused by a shake operation. An example of such a waveform is a waveform having an extremely large or small peak value or an extremely long or short interval between 0-cross timings.

In addition, when a next valid mountain satisfying the restrictive validity conditions newly appears, the positive/negative polarity condition and the time-wise restrictive condition are examined. Then, on the basis of the existence of such opposite polarities and the existence of such continuity, it is possible to properly exclude a waveform not demonstrating the continuity of a couple of back-and-forth motions caused by a shake operation. An example of such a waveform is a waveform having an extremely long or short distance between the newly appearing valid mountain and the immediately preceding valid mountain or the a waveform with a newly appearing valid mountain having the same polarity of its peak value as the peak value of the immediately preceding valid mountain.

Thus, in accordance with the shake-operation detection technique provided by the embodiment, it is possible to effectively prevent a shake operation from being detected mistakenly.

Let us assume a case in which a shake operation is detected in accordance with the shake-operation detection technique according to the embodiment by examining the evaluation signals J shown in FIGS. 6B and 7B as evaluation signals J each obtained as a result of the day-to-day ordinary use of the portable electronic apparatus. As described earlier, the evaluation signal J shown in FIG. 6B is obtained when the portable electronic apparatus is used by being inserted in a back pack whereas the evaluation signal J shown in FIG. 7B is obtained when the portable electronic apparatus is used by being hung from a strap. In the case of the evaluation signal J shown in FIG. 6B, the waveform is shifted in a direction toward one of the polarities of the peak values by an offset from the 0 level serving as the center of the polarities. Thus, particularly in this case, the amplitude of each peak value on the negative-polarity side is not sufficient as is obvious from the figure. As a result, it is very certainly out of the bounds of possibility that a shake operation is mistakenly detected by adoption of the shake-operation detection technique according to the embodiment on the basis of the evaluation signal J shown in FIG. 6B. In the case of the evaluation signal J shown in FIG. 7B, on the other hand, the interval between 0 crosses is rather long so that, also in this case, it is out of the bounds of possibility that a shake operation is mistakenly detected by adoption of the technique according to the embodiment on the basis of the evaluation signal J shown in FIG. 7B. Thus, in accordance with the shake-operation detection technique provided by the embodiment, it is possible to effectively prevent a shake operation from being detected mistakenly.

In addition, in the embodiment, an evaluation signal J representing the amplitudes of acceleration signals as well as positive and negative polarities of the acceleration signals is generated as a signal to be used in a process to detect a shake operation and a technique based on conditions set for the time, amplitude as well as positive/negative polarity alternation of the evaluation signal J is adopted as a technique for detecting the shake operation. Thus, a shake operation deliberately carried out by the user can be defined as an operation to be detected for the purpose of controlling predetermined operations to be performed by the portable electronic apparatus. An acceleration pattern very hardly generated as a day-to-day pattern can be taken as an acceleration pattern generated by such a shake operation. Thus, in this embodiment, an operation to be detected is a shake operation, which is not a day-to-day operation, whereas the technique for detecting an operation, which is not a day-to-day operation, is a technique specialized for detection of a shake operation. Since the technique adopted by the embodiment as a technique for detecting an operation, which is not a day-to-day operation, is specialized for detection of a shake operation, it is possible to effectively prevent a shake operation from being detected mistakenly.

[Typical Actual Operation Control According to a Detected Shake Operation]

In the portable content player 1 according to the embodiment, in accordance with a shake operation detected on the basis of results of examining a variety of conditions set for the evaluation signal J explained earlier, the portable content player 1 is controlled to carry out an operation determined in advance. To put it concretely, the control unit 12 employed in the portable content player 1 according to the embodiment executes control to switch the reproduction mode from a normal reproduction mode to a shuffle reproduction mode or vice versa in accordance with a result of detecting a shake operation carried out by the user.

The shuffle reproduction mode is a mode in which an operation is carried out to reproduce a plurality of contents in a random reproduction order in place of a normal reproduction order set for a process to reproduce a plurality of contents in the normal reproduction mode. Let us assume for example that a plurality of contents pertain to an album. In this case, the normal reproduction order is a reproduction order set for the album. The reproduction order set for an album is referred to as an album intra reproduction order. If the shuffle reproduction mode is deliberately set in such the operation to reproduce the contents of the album, however, the contents selected at random are sequentially reproduced in a random reproduction order in place of the album infra reproduction order.

To put it concretely, in the shuffle reproduction mode of the portable content player 1 according to the embodiment, shuffle reproduction operations called 'Repeat Shuffle All' and 'Repeat Shuffle Folder' can be carried out. In the 'Repeat Shuffle All' reproduction operation, the reproduction range covers all contents (or all pieces of musical data) stored in advance in the content storage unit 4 and, thus, all the musical contents are reproduced in the shuffle reproduction mode. The word 'Repeat' used in the name of the reproduction operation suggests that the operation to reproduce the contents in the shuffle reproduction mode is carried out repeatedly till the user performs an operation to stop the reproduction operation. In the 'Repeat Shuffle Folder' reproduction operation, on the other hand, the reproduction range covers contents (or pieces of musical data) stored in a specified folder in the content storage unit 4 and, thus, the musical contents in the folder are reproduced in the shuffle reproduction mode. By the same token, the word 'Repeat' used in the name of the reproduction operation suggests that the operation to reproduce the contents in the shuffle reproduction mode is carried out repeatedly till the user performs an operation to stop the reproduction operation.

In the normal reproduction mode of the portable content player 1 according to the embodiment, on the other hand, normal reproduction operations called 'All Songs (Normal)', 'Folder', 'Repeat All', 'Repeat Folder' and 'Repeat 1 Song' can be carried out. In the 'All Songs' normal reproduction operation, the reproduction range covers all pieces of musical data stored in advance in the content storage unit 4 and, thus, all the musical contents are reproduced in a list-up order also referred to as a reproduction list order. Since the word 'Repeat' is not used in the name of the reproduction operation, as the reproduction of the content on the list is completed, the reproduction operation is ended automatically. In the 'Folder' normal reproduction operation, the reproduction range covers pieces of musical data stored in a specified folder and, thus, the musical contents stored in the specified folder are reproduced in a list-up order. In the 'Repeat All' normal reproduction operation, the reproduction range covers all pieces of musical data stored in advance in the content storage unit 4, same range as 'All Song', and thus, all the musical contents are reproduced repeatedly in a list-up order. In the 'Repeat Folder' normal reproduction operation, the reproduction range covers pieces of musical data stored in a specified folder, same range as 'Folder', and thus, the musical contents stored in the specified folder are reproduced repeatedly in a list-up order. In the 'Repeat 1 Song' normal reproduction operation, a specified content is reproduced repeatedly.

In a shake-on action taken as confirmation of detection of a shake operation, the control unit 2 executes control to change the reproduction mode from the normal reproduction mode to the shuffle reproduction mode if the present reproduction mode is the normal reproduction mode. If the present reproduction mode is the shuffle reproduction mode, on the other hand, the control unit 2 executes control to change the reproduction mode from the shuffle reproduction mode to the normal reproduction mode in a shake-on action.

Typical switching of the reproduction mode is explained as follows. First of all, if the present reproduction mode is the normal reproduction mode in which 'All Songs', 'Folder' or 'Repeat All' normal reproduction operation is carried out, the normal reproduction mode is changed to the shuffle reproduction mode as follows:

'All Songs'→'Repeat Shuffle All',
'Folder'→'Repeat Shuffle Folder' or
'Repeat All'→'Repeat Shuffle All'.

It is to be noted that, if the present reproduction mode is the normal reproduction mode in which 'Repeat 1 Song' normal reproduction operation is carried out, the normal reproduction mode is not changed to the shuffle reproduction mode.

If the present reproduction mode is the shuffle reproduction mode in which 'Repeat Shuffle All' or 'Repeat Shuffle Folder' shuffle reproduction operation is carried out, on the other hand, the shuffle reproduction mode is changed to the normal reproduction mode as follows:

'Repeat Shuffle All'→'Repeat All' or
'Repeat Shuffle Folder'→'Repeat Folder'.

In addition, when the normal reproduction mode is changed to the shuffle reproduction mode in an operation to switch the reproduction mode in accordance with a shake action, control is executed to reproduce a content different from a content being reproduced in the normal reproduction mode. When the shuffle reproduction mode is conversely changed to the normal reproduction mode in an operation to switch the reproduction mode in accordance with a shake action, on the other hand, control is executed to continue the reproduction of a content reproduced in the shuffle reproduction. Then, as the reproduction of the content is ended or the reproduction mode is changed at the end of the reproduction of the content, next contents on a reproduction list are reproduced in accordance with a reproduction-list order. Let us assume that the shuffle reproduction mode is changed to the normal reproduction mode as follows: 'Repeat Shuffle All'→'Repeat All'. In this case, the reproduction list includes contents in a reproduction range, which covers all contents stored in advance in the content storage unit 4. Thus, after the reproduction of a content being reproduced in the shuffle reproduction mode is ended, a content included on the reproduction list as a content immediately following the reproduced content is reproduced next. As another example, let us assume that the shuffle reproduction mode is changed to the normal reproduction mode as follows: 'Repeat Shuffle Folder' 'Repeat Folder'. In this case, the reproduction list includes contents in a reproduction range, which covers contents stored in a specified folder. Thus, after the reproduction of a content being reproduced in the shuffle reproduction mode is ended, a content included on the reproduction list as a content immediately following the reproduced content is reproduced next.

In addition, when the normal reproduction mode is changed to the shuffle reproduction mode or vice versa in an operation to switch the reproduction mode in accordance with a shake action in the embodiment, control is executed to output a sound effect. To put it concretely, when this control is executed in an operation to change the reproduction mode from the normal reproduction mode to the shuffle reproduction mode upon detection of a shake operation, an operation to reproduce a content different from a content being reproduced in the normal reproduction mode is started after the sound effect has been output. When this control is executed in an operation to change the reproduction mode from the shuffle reproduction mode to the normal reproduction mode upon detection of a shake operation, on the other hand, a reproduction operation is carried out by continuing the reproduction of a content being reproduced in the shuffle reproduction mode after the sound effect has been output.

In addition, in the embodiment, in accordance with operation control related a reproduction mode set in accordance with detection of a shake operation as described above, control to turn on the acceleration sensor 12 is also executed when a content is being reproduced. To put it concretely, in accordance with an already established state to start reproduction of a content, the control unit 2 controls a battery serving as a power-supply unit to supply power to the acceleration sensor 12. An example of the state to start reproduction of a content is a state in which a command to start reproduction of a content has been entered as an operation input by the user by operating the operation unit 8. In accordance with an already established state to stop reproduction of a content, on the other hand, the control unit 2 executes control to turn off the acceleration sensor 12. An example of the state to stop reproduction of a content is a state in which a command to stop reproduction of a content has been entered as an operation input by the user by operating the operation unit 8. By execution of the control operations described above, the acceleration sensor 12 is turned on if necessary. Thus, power consumption can be made small in comparison with, for example, an apparatus in which the acceleration sensor 12 is put in an on state all the time.

As described above, the portable content player 1 according to the embodiment switches the reproduction mode from the normal reproduction mode to the shuffle reproduction mode or vice versa when a shake operation is detected. Thus, with this feature of reproduction-mode switching, shaking caused by a shake operation carried out by the user allows the user to feel the sense of mixing contents in a shuffle reproduction mode. In addition, with this feature of reproduction-mode switching, it is possible to improve the entertaining characteristic of the portable content player 1. Moreover, this feature of reproduction-mode switching implements a useful user interface capable of providing the user with an intuitive sense of operations.

[Processing]

By referring flowcharts shown in FIGS. 12 to 16, the following description explains processing to be carried out in order to implement the operations explained so far as the operations of the embodiment. First of all, FIGS. 12 to 15 show flowcharts illustrating the flows of processing to be carried out in order to detect a shake operation. It is to be noted that the processing to detect a shake operation is carried out on the basis of a shake-operation detection program 3a stored in the nonvolatile memory unit 3 as a program to be executed by the CPU employed in the control unit 2.

Figure 12:
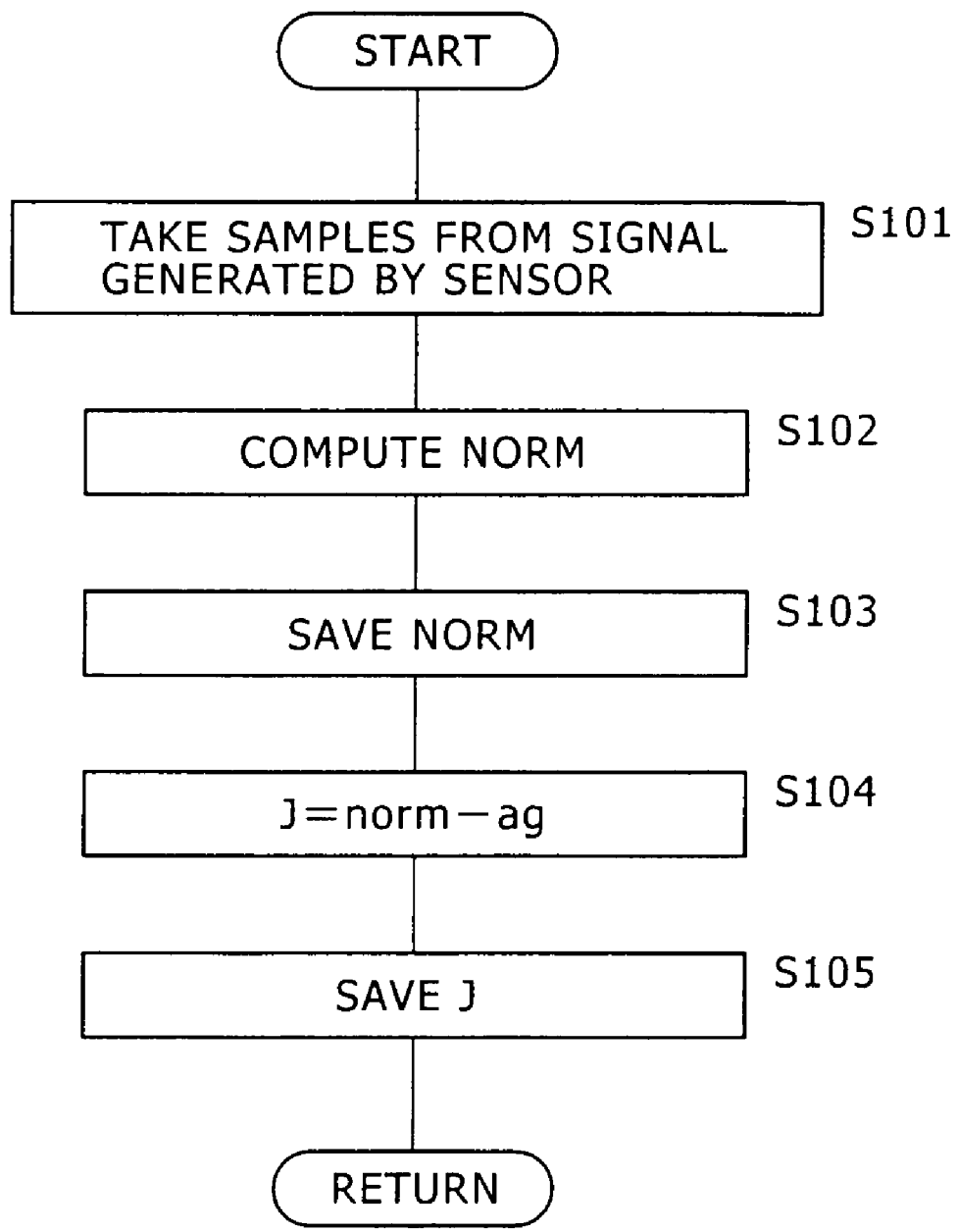
FIG. 12 shows a flowchart exhibiting the flow of processing carried out to generate an evaluation signal J on the basis of an acceleration signal as a particular part of processing to detect a shake operation in accordance with the embodiment.

FIG. 12 shows a flowchart exhibiting the flow of processing carried out to generate an evaluation signal J on the basis of an acceleration signal from the acceleration sensor 12 as a particular part of processing to detect a shake operation in accordance with the embodiment. As shown in the figure, the flowchart begins with a step S101 at which acceleration signals generated by the acceleration sensor 12 are sampled. To be more specific, at this step, acceleration signals generated by the acceleration sensor 12 as signals for the Y and Z axes are sampled. Sampled values ay for the Y axis and sampled values az for the Z axis are thus obtained.

Then, at the next step S102, a sum norm is computed. To put it in detail, the CPU finds the absolute value of the value ay obtained at the step S101 as a sampled value ay of the acceleration signal generated for the Y axis and the absolute value of the value az obtained at the step S101 as a sampled value az of the acceleration signal generated for the Z axis. Then, the sum norm of the absolute values is computed. Subsequently, at the next step S103, the computed sum norm is stored in an internal RAM employed in the control unit 2 or the like.

Then, at the next step S104, an evaluation signal J is computed. To put it in detail, an evaluation signal J is computed by subtracting a presently stored average value ag to be described below from the sum norm found at the step S102.

As is obvious from the above description, it is necessary to find the average value ag in advance in order to compute the evaluation signal J. Abbreviated in the figures, the control unit 2 finds the average value ag in processing carried out in parallel to the processing represented by the flowchart shown in FIG. 12. The sum norm is computed at the step S102 and stored in the internal RAM at the step S103 for every sampling timing. The average value ag is the average of the sums norm each computed and stored at one of sampling times during a period determined in advance.

Then, at the next step S105, the evaluation signal J computed at the step S104 is stored. After the evaluation signal J is stored, the flow of program execution returns to the calling program.

Figure 13:
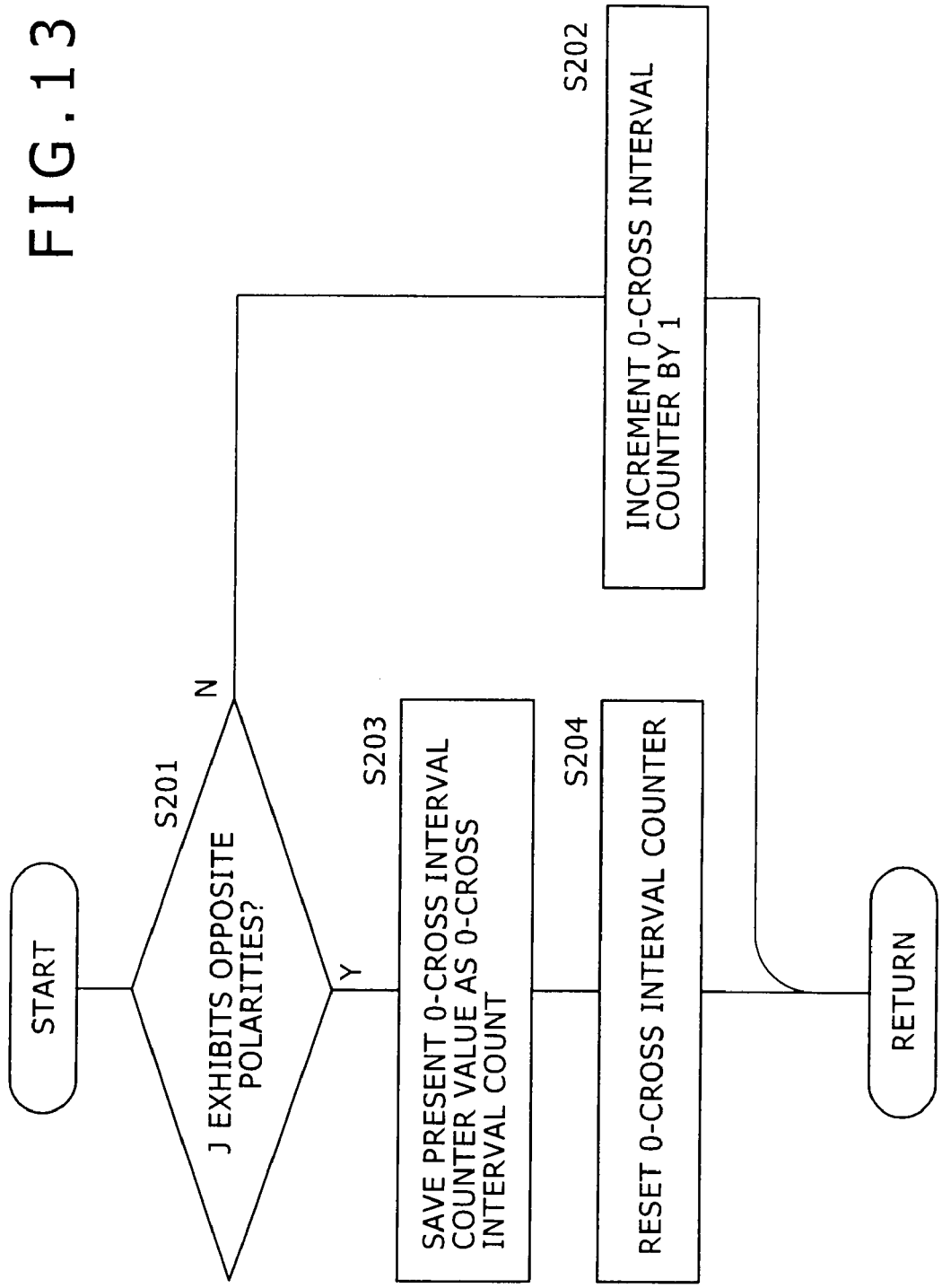
FIG. 13 shows a flowchart exhibiting the flow of processing carried out to obtain information on a count value representing a result of counting carried out during a period between 0 crosses as a particular part of processing to detect a shake operation in accordance with the embodiment.

FIG. 13 shows a flowchart exhibiting the flow of processing carried out to obtain information on a count value counted between 0 crosses as a particular part of processing to detect a shake operation in accordance with the embodiment. As shown in the figure, the flowchart begins with a step S201 to carry out a process of producing a result of determination as to whether or not two consecutive values of the evaluation signal J have polarities opposite to each other. That is to say, the value stored at the step S105 for the present sampling time as the value of the evaluation signal J is compared with the value stored at the step S105 for the immediately preceding sampling time in order to produce a result of determination as to whether or not the two consecutive values of the evaluation signal J have polarities opposite to each other. The process carried out at the step S201 is a process of producing a result of determination as to whether or not the evaluation signal J has changed from a specific polarity to another polarity opposite to the specific polarity through a 0 cross.

If the determination result produced in the process carried out at the step S201 is a negation indicating that the two consecutive values of the evaluation signal J have polarities not opposite to each other, the flow of the processing goes on to a step S202 at which the value of a 0-cross interval counter is incremented by 1 (+1). Then, the flow of program execution returns to the calling program as shown in the figure. The 0-cross interval counter is a counter implemented by a process carried out by the control unit 2 as a counter for measuring the interval between two consecutive 0 crosses or measuring the length of a period between two consecutive 0 crosses.

If the determination result produced in the process carried out at the step S201 is an affirmation indicating that the two consecutive values of the evaluation signal J indeed have polarities opposite to each other, on the other hand, the flow of the processing goes on to a step S203 at which the present value of the 0-cross interval counter is saved as the 0-cross interval count. Then, at the next step S204, the 0-cross interval counter is reset to 0. Finally, the flow of program execution returns to the calling program as shown in the figure.

Figure 14:
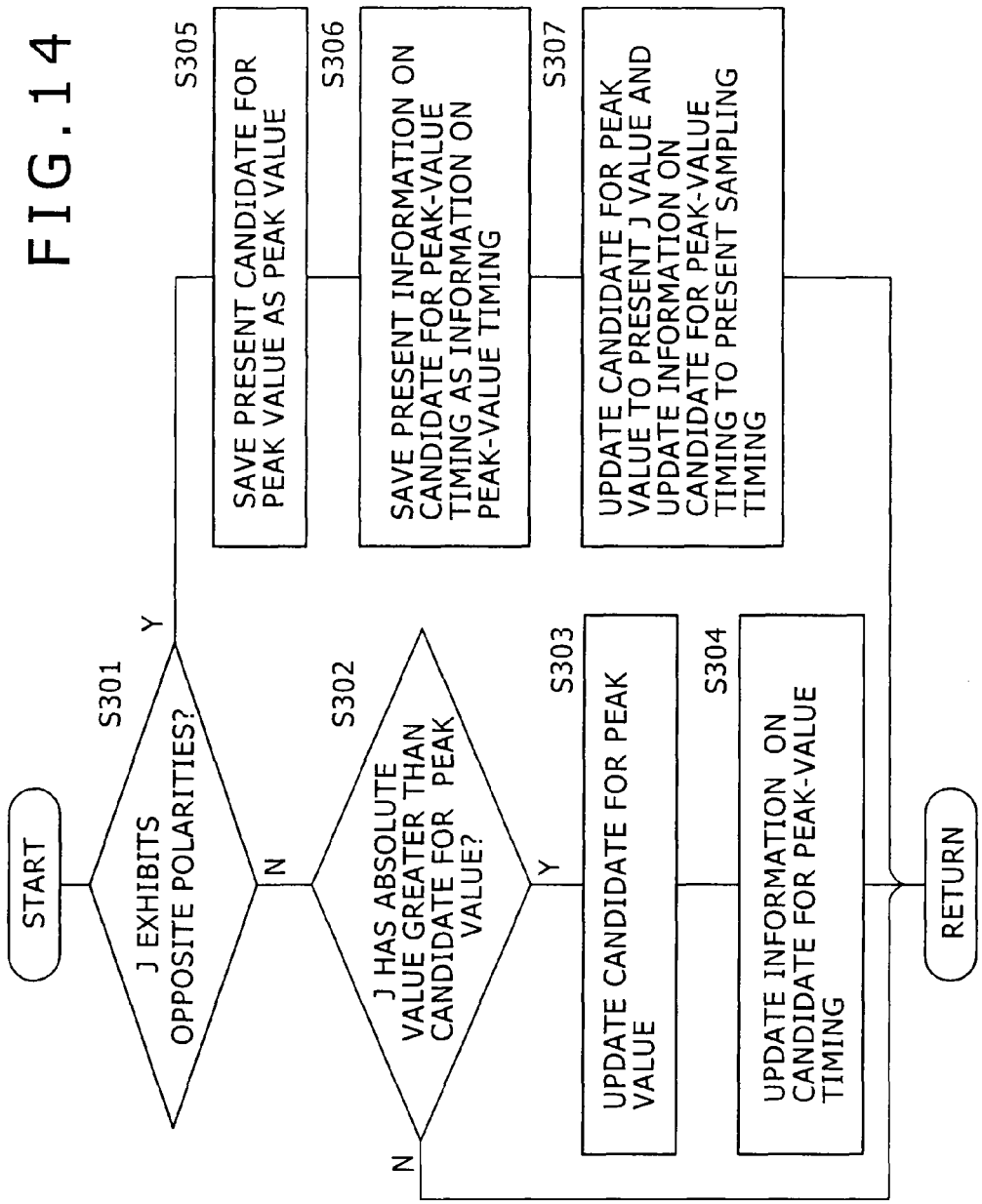
FIG. 14 shows a flowchart exhibiting the flow of processing carried out to obtain information on a peak value and the timing of the peak value as a particular part of processing to detect a shake operation in accordance with the embodiment.

FIG. 14 shows a flowchart exhibiting the flow of processing carried out to obtain information on the peak value of a mountain appearing in the waveform of the evaluation signal J and the timing of the peak value as a particular part of processing to detect a shake operation in accordance with the embodiment. As shown in the figure, the flowchart begins with a step S301 to carry out a process of producing a result of determination as to whether or not two consecutive values of the evaluation signal J have polarities opposite to each other in the same way as the step S201 of the flowchart shown in FIG. 13. If the determination result produced in the process carried out at the step S301 is a negation indicating that the two consecutive values of the evaluation signal J have polarities not opposite to each other, the flow of the processing goes on to a step S302 to carry out a process of producing a result of determination as to whether or not the absolute value of the present value of the evaluation signal J is greater than a candidate for a peak value.

The aforementioned candidate for a peak value is a tentative value used in a process for finding the peak value. As will be described later, if the absolute value of the present value of the evaluation signal J is greater than the candidate for the peak value, the candidate is updated by replacing the candidate with the absolute value. If the absolute value of the present value of the evaluation signal J is not greater than the candidate for the peak value, on the other hand, the candidate is not updated. The candidate obtained eventually is used as the peak value.

If the determination result produced in the process carried out at the step S302 is a negation indicating that the absolute value of the present value of the evaluation signal J is not greater than the candidate for the peak value, the flow of program execution returns to the calling program without carrying out further processes as shown in the figure. If the determination result produced in the process carried out at the step S302 is an affirmation indicating that the absolute value of the present value of the evaluation signal J is indeed greater than the candidate for the peak value, on the other hand, the flow of the processing goes on to a step S303 at which the candidate for the peak value is updated. To put it concretely, the candidate is replaced by the absolute value of the present value of the evaluation signal J.

Then, at the next step S304, information on a candidate for the timing of the peak value is updated. The information on a candidate for the timing of the peak value is stored information to be used in determination of the timing of the peak value. To put it concretely, at the next step S304, the information on a candidate for the timing of the peak value is replaced with information on the present sampling timing. In this way, when the candidate for a peak value is updated, the information on a candidate for the timing of the peak value is also updated as well. Thus, the eventually obtained candidate for the timing of the peak value is used as the timing of the peak value.

If the determination result produced in the process carried out at the step S301 is an affirmation indicating that the two consecutive values of the evaluation signal J indeed have polarities opposite to each other, on the other hand, the flow of the processing goes on to a step S305 at which the present candidate for the peak value is saved in a memory as the peak value. Then, at the next step S306, the present information on a candidate for the timing of the peak value is saved in a memory as information on the peak-value timing.

Subsequently, at the next step S307, the candidate for the peak value is updated by replacing the candidate with the present value of the evaluation signal J and information on a candidate for the timing of the peak value is updated by replacing the information with the present sampling timing. In this way, when two consecutive values of the evaluation signal J have polarities opposite to each other, the present value of the evaluation signal J is used as the first candidate for the peak value of the waveform of the evaluation signal J and the present sampling timing is used as the information on a candidate for the timing of the peak value. Then, after the execution of the process of the step S307 is completed, the flow of program execution returns to the calling program as shown in the figure.

Figure 15:
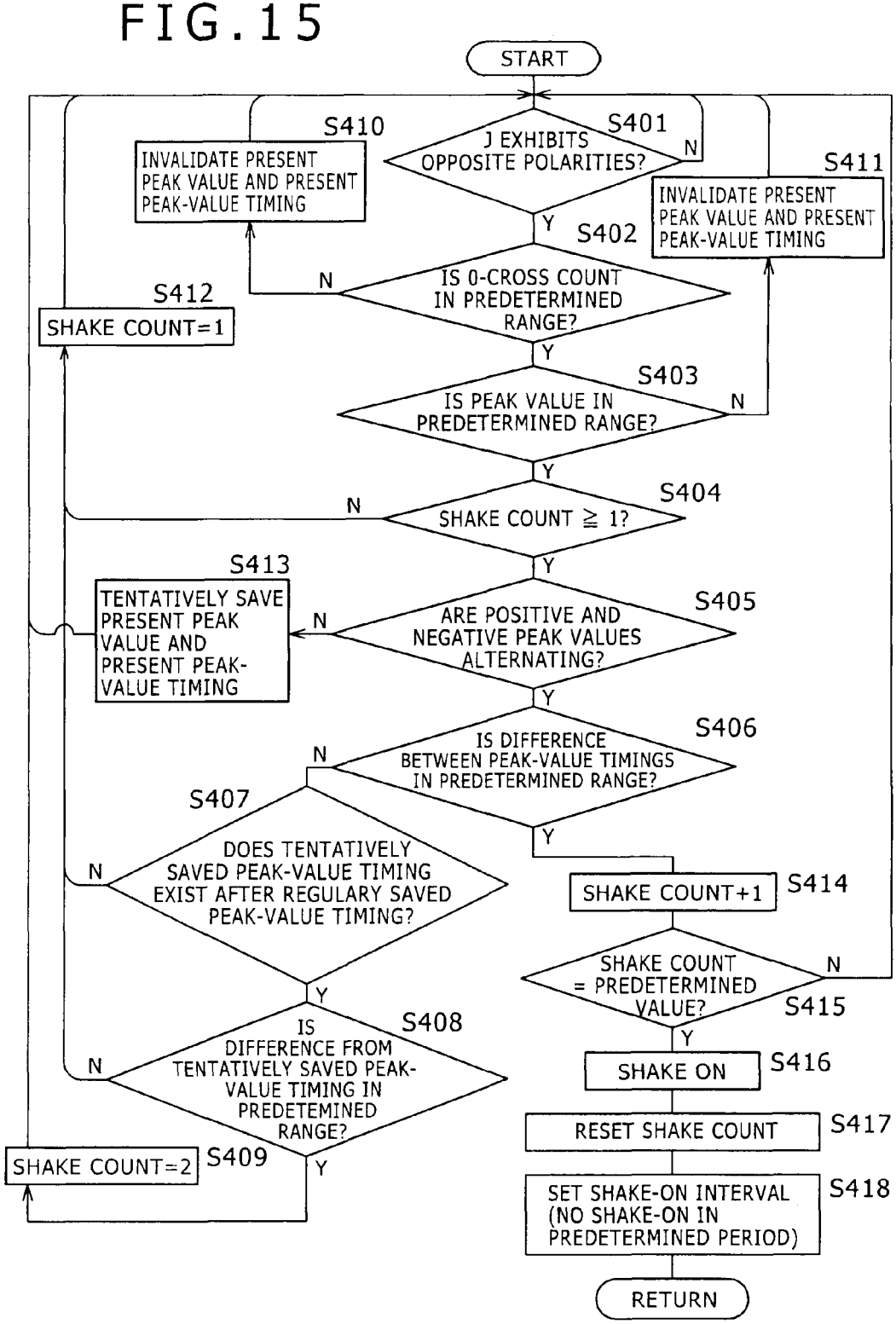
FIG. 15 shows a flowchart exhibiting the flow of processing carried out to produce a variety of determination results for determining a shake operation as a particular part of processing to detect a shake operation in accordance with the embodiment.

FIG. 15 shows a flowchart exhibiting the flow of processing carried out to produce a variety of determination results for detection of a shake operation by making use of a 0-cross interval count value obtained in the processing represented by the flowchart shown in FIG. 13 as a count value for the evaluation signal J obtained in the processing represented by the flowchart shown in FIG. 12 as well as making use of a peak value and information on the timing of the peak value, which have been obtained in the processing represented by the flowchart shown in FIG. 14, as a particular part of processing to detect a shake operation in accordance with the embodiment. As shown in FIG. 15, the flowchart begins with a step S401 to carry out a process of producing a result of determination as to whether or not two consecutive values of the evaluation signal J have polarities opposite to each other. If the determination result produced in the process carried out at the step S401 is a negation indicating that the two consecutive values of the evaluation signal J have polarities not opposite to each other, the flow of the processing goes back to the step S401 to repeat the determination process of the step. As a matter of fact, the determination process of the step S401 is carried out repeatedly in a state of waiting for an affirmation determination result to indicate that two consecutive values of the evaluation signal J indeed have polarities opposite to each other. As the determination result produced in the process carried out at the step S401 becomes an affirmation indicating that the two consecutive values of the evaluation signal J indeed have polarities opposite to each other, the flow of the processing goes on to a step S402 to carry out a process of producing a result of determination as to whether or not the 0-cross interval count has a value in a range determined in advance. The range determined in advance is a range between the aforementioned threshold values zcrs1 and zcrs2 determined in advance as explained earlier by referring to FIG. 8.

If the determination result produced in the process carried out at the step S402 is a negation indicating that the 0-cross interval count has a value not in the range between the threshold values zcrs1 and zcrs2 determined in advance, the flow of the processing goes on to a step S410 at which the present peak value and the timing of the present peak value are invalidated. By carrying out the process of the step S410, it is possible to prevent the peak value of the present mountain appearing in the waveform of the evaluation signal J and the timing of the present peak value from being used as the peak value of the immediately preceding mountain and the timing of the peak value of the immediately preceding mountain respectively when a next valid mountain following the immediately preceding mountain is detected. This is because the present mountain is an invalid mountain not satisfying a condition requiring that the 0-cross interval count shall have a value in the range between the threshold values zcrs1 and zcrs2 determined in advance. After the execution of the process of the step S410 is completed, the flow of the processing goes back to the step S401 as shown in the figure. In this way, the determination process of the step S401 can be carried out repeatedly in a state of waiting for a next 0-cross timing to arrive as a timing with which two consecutive values of the evaluation signal J have polarities opposite to each other as well as waiting for the 0-cross interval count shall have a value in the range between the threshold values zcrs1 and zcrs2 determined in advance.

If the determination result produced in the process carried out at the step S402 is an affirmation indicating that the 0-cross interval count indeed has a value in the range between the threshold values zcrs1 and zcrs2 determined in advance, on the other hand, the flow of the processing goes on to a step S403 to carry out a process of producing a result of determination as to whether or not the peak value is in a range determined in advance, that is, whether or not the peak value is in a range between the afore mentioned threshold values max1 and max2 determined in advance.

If the determination result produced in the process carried out at the step S403 is a negation indicating that the peak value is not in the range determined in advance, the flow of the processing goes on to a step S411 at which the present peak value and the timing of the present peak value are invalidated. After the execution of the process of the step S411 is completed, the flow of the processing goes back to the step S401 as shown in the figure. By carrying out the process of the step S411, it is possible to prevent the peak value of the present mountain of the waveform of the evaluation signal J and the timing of the present peak value from being used as the peak value of the immediately preceding mountain and the timing of the peak value of the immediately preceding mountain respectively when a next valid mountain following the immediately preceding mountain is detected. This is because, as is the case with the step S410 described earlier, the present mountain is an invalid mountain not satisfying a condition requiring that the peak value shall be a value in the range between the threshold values max1 and max2 determined in advance.

If the determination result produced in the process carried out at the step S403 is an affirmation indicating that the peak value is indeed a value in the range determined in advance, on the other hand, the flow of the processing goes on to a step S404 to carry out a process of producing a result of determination as to whether or not the value of the shake count is at least equal to 1. If the determination result produced in the process carried out at the step S404 is a negation indicating that the value of the shake count is smaller than 1, the flow of the processing goes on to a step S412 at which the value of the shake count is set at 1. Then, the flow of the processing goes back to the step S401 as shown in the figure.

If the determination result produced in the process carried out at the step S404 is an affirmation indicating that the value of the shake count is indeed at least equal to 1, on the other hand, the flow of the processing goes on to a step S405 to carry out a process of producing a result of determination as to whether or not two successive positive and negative peak values alternate, that is, whether or not the polarity of a preceding peak value not invalidated is opposite to the polarity of the present peak value. In this case, the present peak value is a peak value immediately before the 0-cross timing detected in the process carried out at the step S401 whereas the preceding peak value is a peak value preceding the present peak value.

If the determination result produced in the process carried out at the step S405 is a negation indicating that 2 consecutive positive and negative peak values do not alternate, the flow of the processing goes on to a step S413 at which the present peak value and the timing of the present peak value are tentatively saved. Then, the flow of the processing goes back to the step S401 as shown in the figure.

If the determination result produced in the process carried out at the step S405 is an affirmation indicating that 2 consecutive positive and negative peak values indeed alternate, on the other hand, the flow of the processing goes on to a step S406 to carry out a process of producing a result of determination as to whether or not the difference in timing between the two successive peak values has a value in a range determined in advance, that is, whether or not the difference in timing between the aforementioned preceding peak value not invalidated and the present peak value described above has a value in a range between the aforementioned threshold values ts1 and ts2 determined in advance.

If the determination result produced in the process carried out at the step S406 is a negation indicating that the difference in timing between the two successive peak values has a value not in the range determined in advance, the flow of the processing goes on to a step S407 to carry out a process of producing a result of determination as to whether or not a peak-value timing between the timing of the aforementioned preceding peak value not invalidated and the timing of the present peak value described above has been tentatively saved. If the determination result produced in the process carried out at the step S407 is a negation indicating that no peak-value timing between the timing of the aforementioned preceding peak value not invalidated and the timing of the present peak value described above has been tentatively saved, the flow of the processing goes on to the step S412 at which the value of the shake count is set at 1. Then, the flow of the processing goes back to the step S401 as shown in the figure.

If the determination result produced in the process carried out at the step S407 is an affirmation indicating that a peak-value timing between the timing of the aforementioned preceding peak value not invalidated and the timing of the present peak value cited above has been indeed tentatively saved, on the other hand, the flow of the processing goes on to a step S408 to carry out a process of producing a result of determination as to whether or not the difference between the tentatively saved peak-value timing and the timing of the present peak value described above has a value in a range determined in advance, that is, whether or not the difference between the tentatively saved peak-value timing and the timing or the present peak value has a value in the range between the aforementioned threshold values ts1 and ts2 determined in advance.

If the determination result produced in the process carried out at the step S408 is a negation indicating that the difference between the tentatively saved peak-value timing and the timing of the present peak value has a value not in the range determined in advance, the flow of the processing goes on to the step S412 at which the value of the shake count is set at 1. Then, the flow of the processing goes back to the step S401 as shown in the figure. If the determination result produced in the process carried out at the step S408 is an affirmation indicating that the difference between the tentatively saved peak-value timing and the timing of the present peak value indeed has a value in the range determined in advance, on the other hand, the flow of the processing goes on to a step S409 at which the value of the shake count is set at 2. Then, the flow of the processing goes back to the step S401 as shown in the figure.

If the determination result produced in the process carried out at the step S406 is an affirmation indicating that the difference in timing between the two successive peak values indeed has a value in a range determined in advance, on the other hand, the flow of the processing goes on to a step S414 at which the value of the shake count is incremented by 1.

Then, at the next step S415, the value of the shake count is compared with a value determined in advance in order to produce a result of determination as to whether or not the value of the shake count is equal to the value determined in advance. In the case of the embodiment, the value determined in advance is 6. If the determination result produced in the process carried out at the step S415 is a negation indicating that the value of the shake count is not equal to the value determined in advance, the flow of the processing goes back to the step S401 as shown in the figure.

If the determination result produced in the process carried out at the step S415 is an affirmation indicating that the value of the shake count is indeed equal to the value determined in advance, on the other hand, the flow of the processing goes on to a step S416 at which a shake-on action is taken as an action confirming that a shake operation has been carried out. Then, at the next step S417, in accordance with the shake-on action, first of all, the value of the shake count is reset to 0. Subsequently, at the next step S418, a shake-on interval is set as an interval following the shake-on action. The shake-on interval is a subsequent period in which no shake-on action is taken. Thus, during the shake-on interval, the control unit 2 does not produce a result of determination as to whether or not a shake operation has been carried out. After the process carried out at the step S418 to set the shake-on interval is completed, the flow of the processing goes back to the step S401 as shown in the figure.

Figure 16:
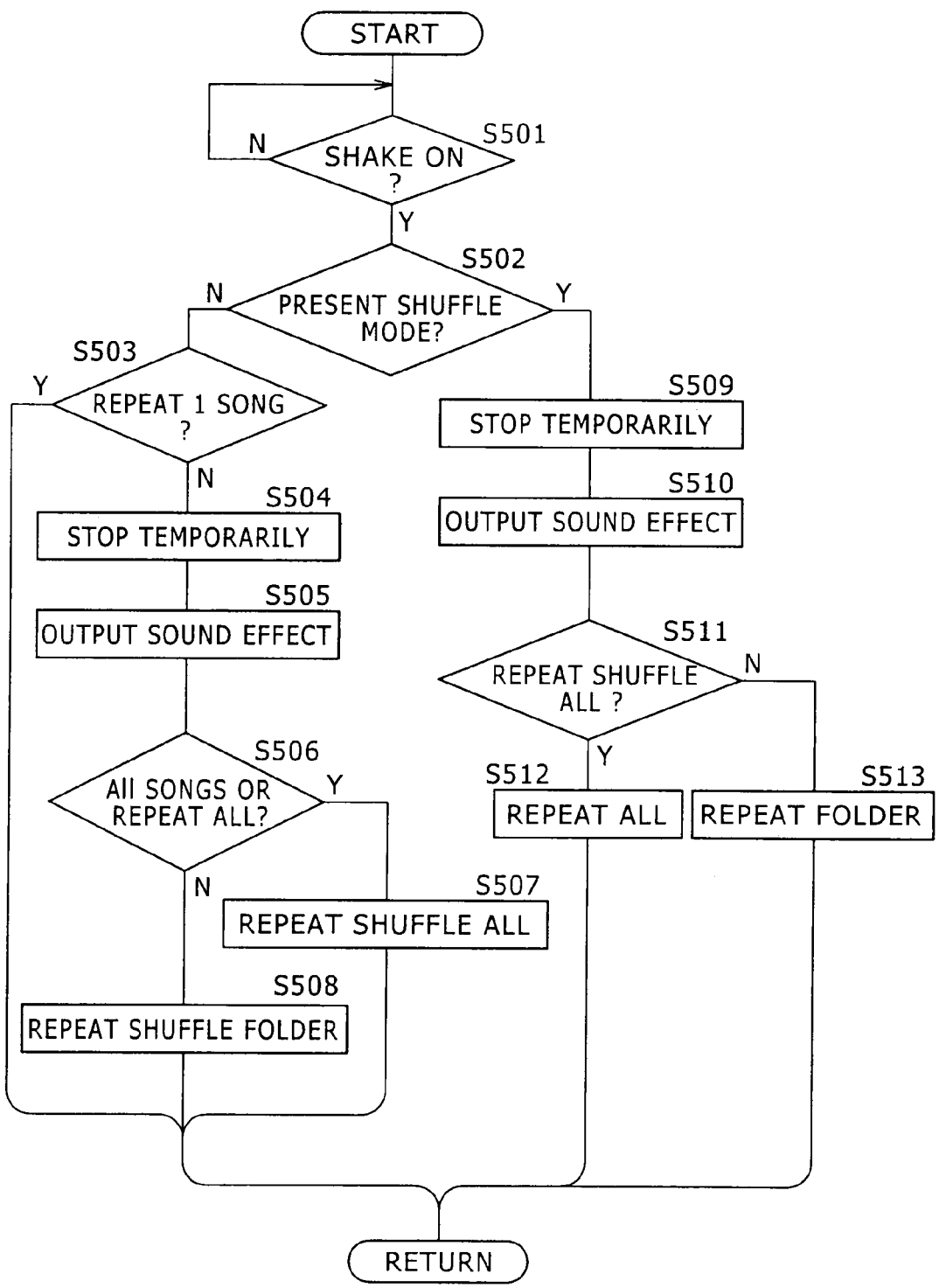
FIG. 16 shows a flowchart exhibiting the flow of processing to be carried out as follow-up processing upon detection of a shake operation.

FIG. 16 shows a flowchart exhibiting the flow of processing to be carried out as follow-up processing upon detection of a shake operation. It is to be noted that the processing represented by the flowchart shown in FIG. 16 is carried out on the basis of a control program 3b stored in advance in the nonvolatile memory unit 3 as a program to be executed by the CPU employed in the control unit 2. As shown in the figure, the flowchart begins with a step S501 to carry out a process of producing a result of determination as to whether or not a shake-on action has been taken. If the determination result produced in the process carried out at the step S501 is a negation indicating that a shake-on action has not been taken, the flow of the processing goes back to the step S501 to repeat the determination process. As a matter of fact, the determination process of the step S501 is carried out repeatedly in a state of waiting for a shake-on action to be taken. As described earlier, a shake-on action is taken in the process carried out at the step S416 of the flowchart shown in FIG. 15 if the determination result produced in the process carried out at the step S415 of the same flowchart is an affirmation.

As a shake-on action is taken, the flow of the processing goes on to a step S502 to carry out a process of producing a result of determination as to whether the present reproduction mode is the shuffle reproduction mode or the normal reproduction mode. As described earlier, in the shuffle reproduction mode, the content is subjected to either a Repeat Shuffle All reproduction operation or a Repeat Shuffle Folder reproduction operation. In the normal reproduction mode, on the other hand, the content is subjected to one of normal reproduction operations called All Songs (Normal), Folder, Repeat All, Repeat Folder and Repeat 1 Song.

If the determination result produced in the process carried out at the step S502 is a negation indicating that the present reproduction mode is not the shuffle reproduction mode, the flow of the processing goes on to a step S503 to carry out first of all a process of producing a result of determination as to whether or not the content is being subjected to the Repeat 1 Song reproduction operation. If the determination result produced in the process carried out at the step S503 is an affirmation indicating that the content is indeed being subjected to the Repeat 1 Song reproduction operation, the flow of program execution returns to the calling program as shown in the figure.

If the determination result produced in the process carried out at the step S503 is a negation indicating that the content is being subjected to a reproduction operation other than the Repeat 1 Song reproduction operation, on the other hand, the flow of the processing goes on to a step S504 at which the reproduction operation is stopped temporarily. Then, at the next step S505, a process to output a sound effect is carried out. To put it in detail, at the step S504, the reproduction processing unit 5 is controlled to temporarily stop the operation to reproduce the present content and, at the step S505, the audio-output processing unit 6 is controlled to output audio data stored in advance typically in the nonvolatile memory unit 3 as the sound effect.

Then, the flow of the processing goes on to a step S506 to carry out first of all a process of producing a result of determination as to whether or not the content is being subjected to either of the All Song normal reproduction operation and the Repeat All normal reproduction operation. If the determination result produced in the process carried out at the step S506 is an affirmation indicating that the content is indeed being subjected to the All Song normal reproduction operation or the Repeat All normal reproduction operation, the flow of the processing goes on to a step S507 to carry out a process of changing the present normal reproduction operation to the Repeat Shuffle All reproduction operation. As described earlier, in the All Songs (Normal) normal reproduction operation, the reproduction range covers all contents (or all pieces of musical data) stored in advance in the content storage unit 4 and, thus, all the musical contents are reproduced in a reproduction-list order. In the Repeat All normal reproduction operation, the reproduction range also covers all contents (or all pieces of musical data) stored in advance in the content storage unit 4 and, thus, all the musical contents are reproduced repeatedly in a reproduction-list order. In the Repeat Shuffle All reproduction operation set at the step S507, on the other hand, the reproduction range also covers all contents (or all pieces of musical data) stored in advance in the content storage unit 4 and, thus, all the musical contents are reproduced in the shuffle reproduction mode selecting any one of the musical contents at random. To put it concretely, at the step S507, first of all, the reproduction processing unit 5 is controlled to switch the operation to select a musical content to be reproduced from an operation carried out so far as an operation based on a reproduction list to a random-selection operation. In this case, the reproduction list covers all musical contents as contents to be reproduced. Then, the reproduction processing unit 5 is controlled to change its setting so as to start the shuffle reproduction mode in which musical contents are reproduced thereafter in the Repeat Shuffle All reproduction operation.

If the determination result produced in the process carried out at the step S506 is a negation indicating that the content is being subjected to a normal reproduction operation other than the All Song normal reproduction operation and the Repeat All normal reproduction operation, on the other hand, the flow of the processing goes on to a step S508 to carry out a process of changing the present reproduction operation to the Repeat Shuffle Folder reproduction operation. The process carried out at the step S508 is similar to the process carried out at the step S507 except that, in the process carried out at the step S508, musical contents reproduced in the shuffle reproduction mode are musical contents pertaining to a specified folder in place of all the musical contents stored in advance in the content storage unit 4. To put it concretely, at the step S508, first of all, the reproduction processing unit 5 is controlled to switch the operation to select a musical content to be reproduced from an operation carried out so far as an operation based on a reproduction list to a random-selection operation. In this case, the reproduction list covers musical contents pertaining to the specified folder as contents to be reproduced. Then, the reproduction processing unit 5 is controlled to change its setting so as to start the shuffle reproduction mode in which musical contents are reproduced thereafter in the Repeat Shuffle Folder reproduction operation.

If the determination result produced in the process carried out at the step S502 is a negation indicating that the present reproduction mode is not the shuffle reproduction mode, on the other hand, the flow of the processing goes on to a step S509 at which the reproduction operation is stopped temporarily in the same way as the process carried out at the step S504. Then, at the next step S510, a process to output a sound effect is carried out in the same way as the process carried out at the step S505.

After the processes to temporarily stop the shuffle reproduction operation and output a sound effect are completed, the flow of the processing goes on to a step S511 to carry out first of all a process of producing a result of determination as to whether or not the content is being subjected to the Repeat Shuffle All reproduction operation. If the determination result produced in the process carried out at the step S511 is an affirmation indicating that the content is indeed being subjected to the Repeat Shuffle All normal reproduction operation, the flow of the processing goes on to a step S512 to carry out a process of changing the present shuffle reproduction operation to the Repeat All normal reproduction operation. As described earlier, in the embodiment, when the present reproduction mode is changed from the shuffle reproduction mode to the normal reproduction mode, the reproduction of a musical content being reproduced is continued. Thus, in the process carried out at the step S512, first of all, the reproduction processing unit 5 is controlled to end the temporary suspension state set in the process carried out at the step S509 as the state of the musical content being reproduced and resume the reproduction of the musical content as a continuation of the temporarily stopped reproduction. Then, the reproduction processing unit 5 is controlled to change its setting so as to start the normal reproduction mode in which musical contents are reproduced thereafter in the Repeat All normal reproduction operation.

If the determination result produced in the process carried out at the step S511 is a negation indicating that the content is not being subjected to the Repeat Shuffle All reproduction operation, on the other hand, the flow of the processing goes on to a step S513 to carry out a process of changing the present reproduction operation to the Repeat Folder normal reproduction operation. The process carried out at the step S513 is similar to the process carried out at the step S512 except that, in the process carried out at the step S513, musical contents reproduced in the normal reproduction mode is musical contents pertaining to a specified folder in place of all the musical contents stored in advance in the content storage unit 4. To put it concretely, at the step S513, first of all, the reproduction processing unit 5 is controlled to end the temporary suspension state set in the process carried out at the step S509 as the state of the musical content being reproduced and resume the reproduction of the musical content as a continuation of the temporarily stopped reproduction. Then, the reproduction processing unit 5 is controlled to change its setting so as to start the normal reproduction mode in which musical contents are reproduced thereafter in the Repeat Folder normal reproduction operation.

[Modified Version]

A modified version of the embodiment is explained by referring to FIGS. 17 to 19 as follows. In the case of the modified version, the operation to detect a shake operation as described earlier is improved. To put it concretely, the present value of the evaluation signal J is compared with a value immediately preceding the present value and, if the difference between the present value and the immediately preceding value is at least equal to a value determined in advance, the present value and/or the immediately preceding value are regarded as values obtained as a result of incorrect detection of the acceleration and, accordingly, the waveform of a mountain including the present value and the immediately preceding value is excluded from processes to determine mountain validity.

Figure 17:
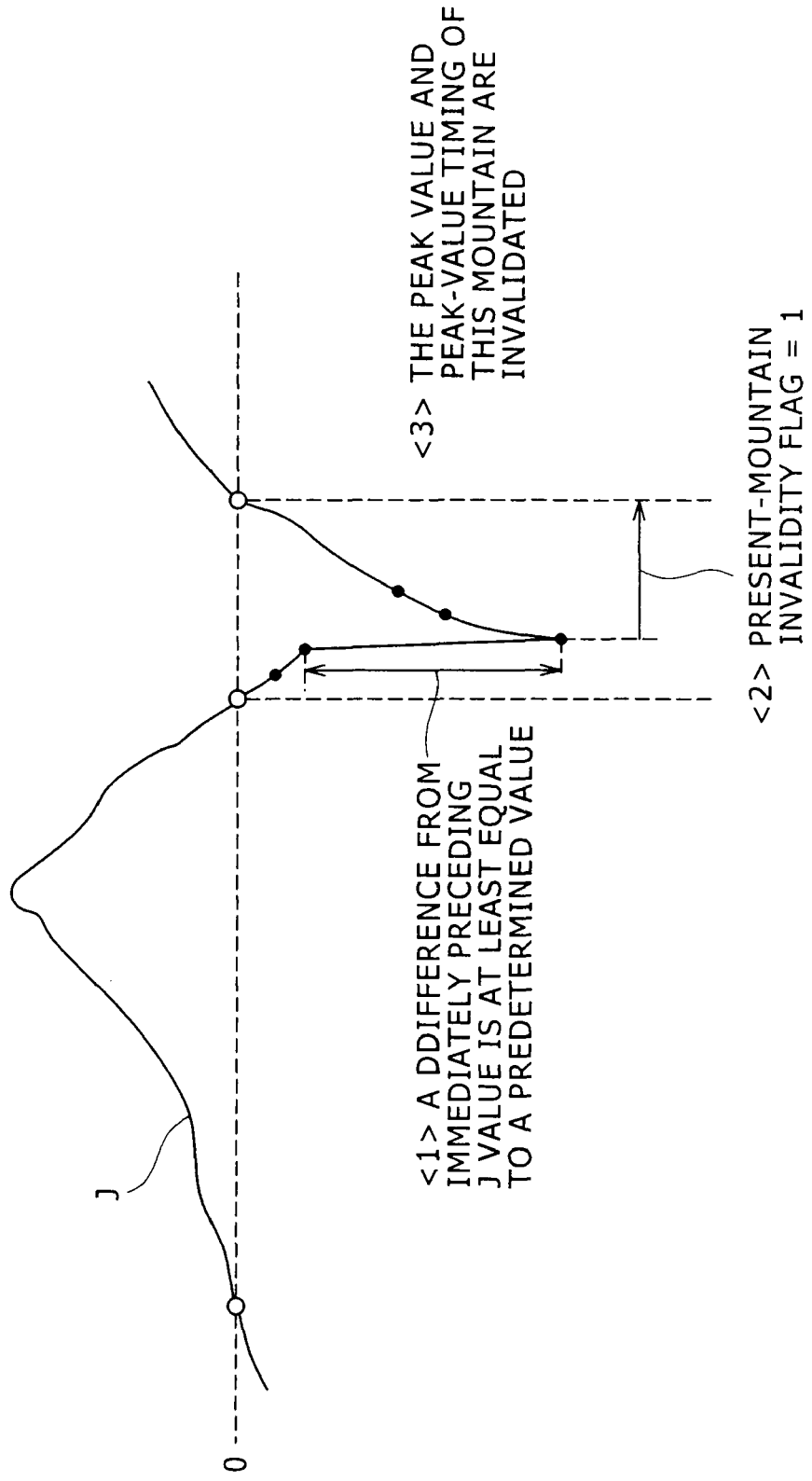
FIG. 17 is an explanatory diagram to be referred to in description of operations carried out in accordance with a modified version of the embodiment.

FIG. 17 is an explanatory diagram to be referred to in description of operations carried out in accordance with a modified version of the embodiment. Let us assume that, as shown by notation <1> in the figure, the difference between a newly computed value of the evaluation signal J and a value computed with the immediately preceding timing as a value of the evaluation signal J is at least equal to the value determined in advance. Detecting such a large difference, a present-mountain invalidity flag is set at 1 as shown by notation <2>. The present-mountain invalidity flag is a flag, the value of which is to be recognized with each 0-cross timing. If the present-mountain invalidity flag is recognized with a 0-cross timing as a flag having a value of 1, the mountain having a waveform appearing during a 0-cross interval preceding the 0-cross timing is invalidated.

Thus, in the case of the modified version, with every 0-cross timing, the value of the present-mountain invalidity flag is recognized and, if the value of the present-mountain invalidity flag is 1, the peak value of the mountain having a waveform appearing during a 0-cross interval preceding the 0-cross timing and the timing of the peak value are invalidated as shown by notation <3>.

Let us assume that the difference between a newly computed value of the evaluation signal J and a value computed with the immediately preceding timing as a value of the evaluation signal J is undesirably at least equal to the value determined in advance. By making use of the present-mountain invalidity flag, the mountain having a waveform appearing during a 0-cross interval preceding the 0-cross timing can be excluded from the processes to determine mountain validity as described above. That is to say, a mountain including incorrectly computed values of the evaluation signal J can be prevented from affecting the value of the shake count. Thus, a shake operation can be effectively prevented from being detected mistakenly.

Figure 18:
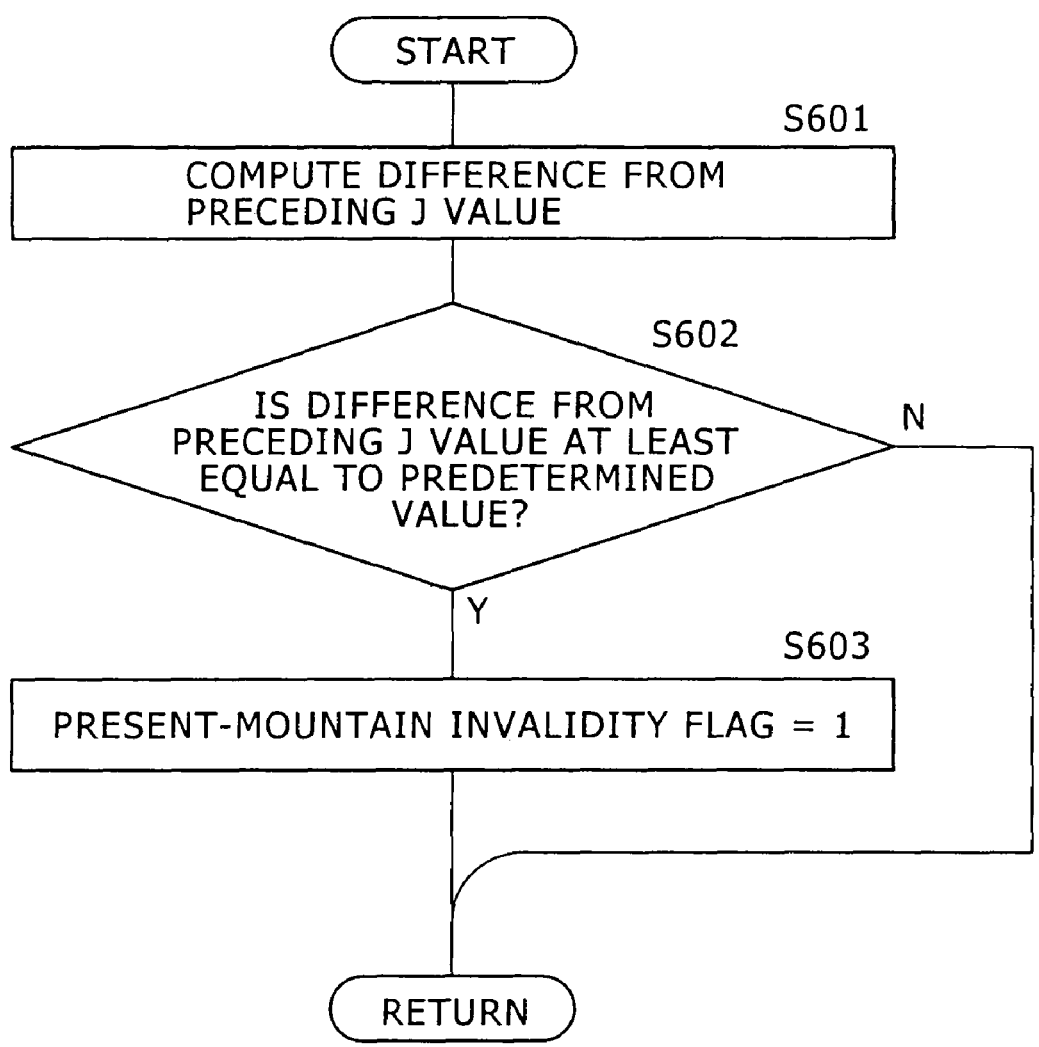
FIG. 18 shows a flowchart exhibiting the flow of processing carried out to set a present-mountain invalidity flag as a particular part of processing to detect a shake operation in accordance with the modified version of the embodiment.
Figure 19:
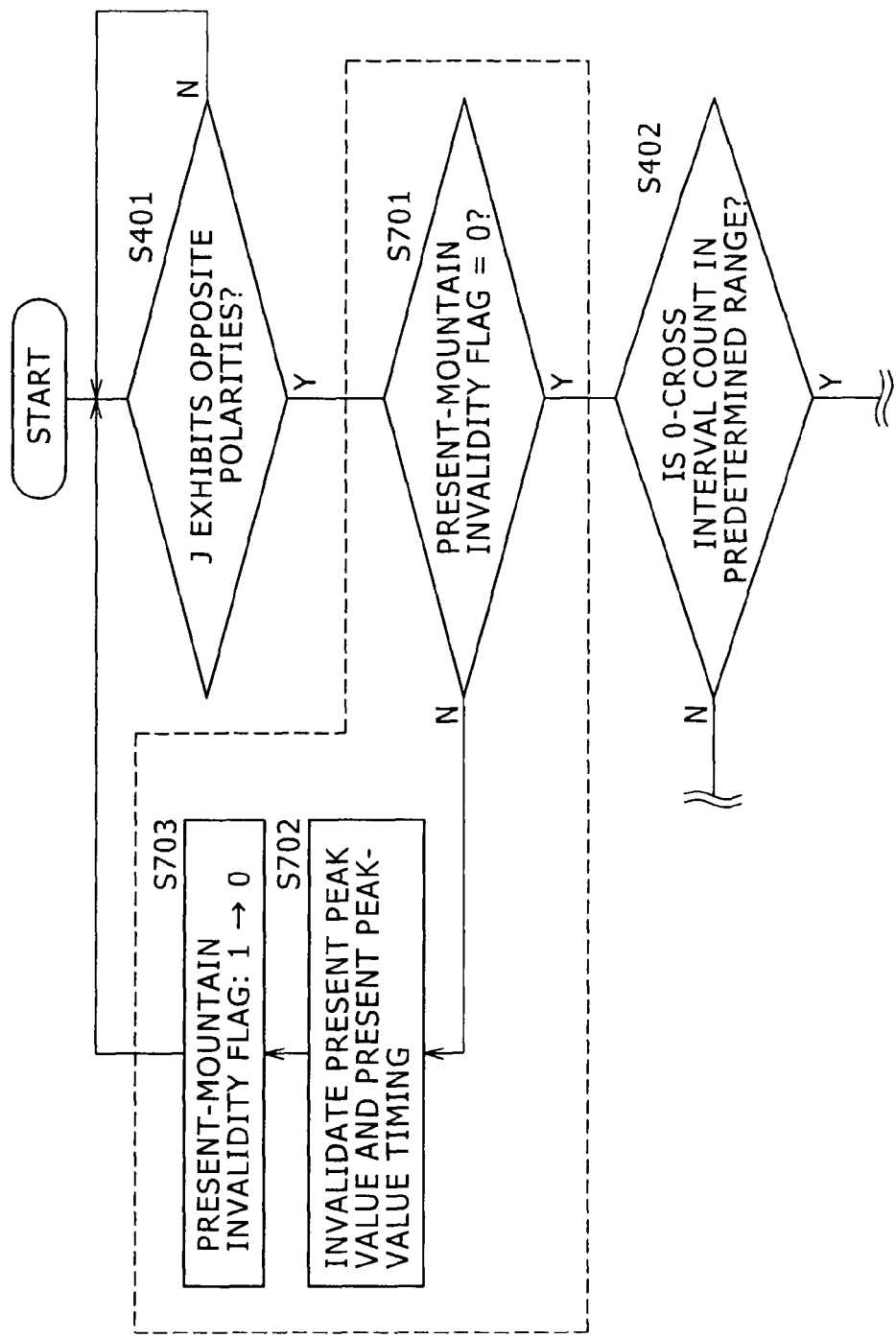
FIG. 19 shows a flowchart exhibiting the flow of processing carried out to produce a determination result on the basis of the present-mountain invalidity flag as a particular part of processing to detect a shake operation in accordance with the modified version of the embodiment.

FIG. 18 shows a flowchart exhibiting the flow of processing carried out to set the present-mountain invalidity flag described above as a particular part of processing to detect a shake operation in accordance with the modified version of the embodiment and FIG. 19 shows a flowchart exhibiting the flow of processing carried out to produce a determination result on the basis of the present-mountain invalidity flag as a particular part of processing to detect a shake operation in accordance with the modified version of the embodiment. It is to be noted that the processing represented by the flowcharts shown in these figures as processing to detect a shake operation is carried out on the basis of a shake-operation detection program 3a stored in the nonvolatile memory unit 3 as a program to be executed by the CPU employed in the control unit 2. That is to say, in the case of the modified version, the shake-operation detection program 3a has a new additional portion represented by the flowchart shown in FIG. 18 and another new additional portion represented by a part enclosed by a dashed line in the flowchart shown in FIG. 19.

First of all, the processing to control the present-mountain invalidity flag in accordance with the modified version is explained by referring to the flowchart shown in FIG. 18. As shown in the figure, the flowchart begins with a step S601 at which the difference between the present value of the evaluation signal J and an evaluation-signal value immediately preceding the present value is computed. The process of the step is carried out for every sampling time. The present value of the evaluation signal J is a value computed with the present sampling timing whereas the evaluation-signal value immediately preceding the present value is a value computed with a sampling timing immediately preceding the present sampling timing.

Then, at the next step S602, the present value of the evaluation signal J is compared with the immediately preceding value in order to produce a result of determination as to whether or not the difference between the present value and the immediately preceding value has a value at least equal to a value determined in advance. If the determination result produced in the process carried out at the step S602 is a negation indicating that the difference between the present value and the immediately preceding value has a value smaller than the value determined in advance, the flow of program execution returns to the calling program as shown in the figure. If the determination result produced in the process carried out at the step S602 is an affirmation indicating that the difference between the present value and the immediately preceding value indeed has a value at least equal to the value determined in advance, on the other hand, the flow of the processing goes on to a step S603 at which the present-mountain invalidity flag is set at 1.

The processing to detect a shake operation in accordance with the modified version is explained by referring to the flowchart shown in FIG. 19. The processing to detect a shake operation in accordance with the modified version includes a process to produce a result of determination as to whether or not the present-mountain invalidity flag has been set. As shown in the figure, in the processing to detect a shake operation by carrying out a process to produce a result of determination as to whether or not the present-mountain invalidity flag has been set in accordance with the modified version, processes enclosed by a dashed line are newly inserted into the processing represented by the flowchart shown in FIG. 15 as processing to detect a shake operation. The newly inserted processes are processes carried out at steps S701, S702 and S703. That is to say, as the determination result produced in the process carried out at the step S401 becomes an affirmation indicating that the two consecutive values of the evaluation signal J indeed have polarities opposite to each other, the flow of the processing goes on to the step S701 inserted in front of the step S402 as shown in the figure. At the step S701, the present-mountain invalidity flag is examined in order to carry out a process of producing a result of determination as to whether or not the present-mountain invalidity flag has been reset to 0. If the determination result produced in the process carried out at the step S701 is an affirmation indicating that the present-mountain invalidity flag has been indeed reset to 0, as shown in the figure, the flow of the processing goes on to the step S402 to carry out a process of producing a result of determination as to whether or not the 0-cross interval count has a value in a range determined in advance. This is because, with the present-mountain invalidity flag reset to 0, it is not specially necessary to carry out an invalidation process caused by a large difference between the present value of the evaluation signal J and a value immediately preceding the present value.

If the determination result produced in the process carried out at the step S701 is a negation indicating that the present-mountain invalidity flag is not 0, that is, a negation indicating that the present-mountain invalidity flag is 1, on the other hand, the flow of the processing goes on to the step S702 to carry out a process to invalidate the present peak value and the timing of the present peak value. Then, at the next step S703, the present-mountain invalidity flag is reset to 0 before the flow of the processing goes back to the step S401.

[Other Modified Versions]

An embodiment of the present invention and a modified version of the embodiment have been described. However, the scope of the present invention is by no means limited to the embodiment and the modified version. For example, even though the embodiment detects a shake operation on the basis of acceleration signals in the directions of the two axes Y and Z, a shake operation can also be detected on the basis of an acceleration signal in the direction of only one axis determined in advance. As an alternative, a shake operation can also be detected on the basis of acceleration signals in the directions of three or more axes determined in advance. If a shake operation is detected on the basis of an acceleration signal in the direction of only one axis determined in advance, for example, the evaluation signal J used for detecting the shake operation is not obtained by subtracting an average from the sum of the absolute values of values obtained by sampling acceleration signals in the directions of all axes for the present sampling timing. In this case, the average is the average of such sums obtained in the past period determined in advance. Instead, the evaluation signal J used for detecting the shake operation is obtained by subtracting an average from the absolute value of a value obtained by sampling the acceleration signal in the direction of the axis determined in advance for the present sampling timing. In this case, the average is the average of such sums obtained in the past period determined in advance. If a shake operation is detected on the basis of an acceleration signal in the direction of only one axis determined in advance, however, it is desirable to limit the shaking direction of the shake operation to be detected to one direction only. If a shake operation is detected on the basis of acceleration signals in the directions of three or more axes determined in advance, the evaluation signal J used for detecting the shake operation is obtained by subtracting an average from the sum of the absolute values of values obtained by sampling the acceleration signals in the directions of all the axes for the present sampling timing. In this case, the average is the average of such sums obtained in the past period determined in advance. In this way, the same effect can be obtained. If a shake operation is detected on the basis of acceleration signals in the directions of three or more axes determined in advance, the shaking direction of the shake operation to be detected can be selected arbitrarily.

As described above, in the case of the embodiment, the evaluation signal J used for detecting a shake operation is obtained by subtracting an average from the sum of the absolute values of values obtained by sampling the acceleration signals in the directions of all the axes for the present sampling timing. In this case, the average is the average of such sums obtained in the past period determined in advance. If a shake operation is detected on the basis of an acceleration signal in the direction of one axis determined in advance, the sum used in calculation of the evaluation signal J is replaced with the absolute value of a value obtained by sampling the acceleration signal in the direction of the axis determined in advance for the present sampling timing. It is to be noted, however, that any other evaluation signal can be used for detecting a shake operation as far as the evaluation signal represents at least the amplitude and polarity of the acceleration. In this case, the polarity of the acceleration is a positive or negative polarity.

In addition, in the case of the embodiment, the condition for incrementing the value of the shake count by 1 demands that two consecutive positive and negative peak values shall alternate and that the difference in timing between the two consecutive peak values shall have a value within a range determined in advance. However, it is possible to provide a configuration in which the condition for incrementing the value of the shake count by 1 imposes more requirements. For example, the condition for incrementing the value of the shake count by 1 may demand that a still-state period with a length determined in advance shall have existed prior to the shake operation. That is to say, since a still-state period with a length determined in advance always exists immediately before the shake operation as demanded by the additional requirement, by making use of this additional requirement as an additional condition, it is possible to prevent a shake operation from being detected mistakenly. To put it concretely, values observed in a predetermined period in the past as values of acceleration signals in the directions of axes are used to produce a result of determination as to whether or not a continuous still-state period with at least a length determined in advance has existed immediately before the shake operation. Then, the value of the shake count is incremented by 1 only on condition that a continuous still-state period with at least a length determined in advance has existed immediately before the shake operation in addition to the fact that two consecutive positive and negative peak values alternate and that the difference in timing between the two consecutive peak values has a value within a range determined in advance. In addition, the condition related to such a continuous still-state period can be applied as a condition for whole detection of a shake operation instead of being applied as a condition for incrementing the value of a shake count by 1. That is to say, only if a continuous still-state period with at least a length determined in advance has existed immediately before a shake operation, are a variety of conditions for detection of a shake operation tested in accordance with the flowchart shown in FIG. 15. In other words, if a continuous still-state period with at least a length determined in advance did not exist immediately before a shake operation, the conditions shown in the flowchart of FIG. 15 are not tested.

In addition, it is also possible to provide a configuration in which the value of the shake count is incremented by 1 if the posture of the portable electronic apparatus prior to a shake operation satisfies a condition determined in advance. For example, the condition determined in advance demands that the orientation of the portable electronic apparatus prior to a shake operation shall be within an angular range determined in advance. In accordance with an apparatus property related to the shake operation to shake the portable electronic apparatus carried by a hand, the posture of the portable electronic apparatus prior to the shake operation satisfies a condition requiring that the angle formed by the vertical center line of the apparatus in conjunction with the gravitational-direction line shall have a value within a predetermined angular range not exceeding a value to a certain degree. By applying the condition requiring that the angle formed by the vertical center line of the apparatus in conjunction with the gravitational-direction line shall have a value within a predetermined angular range, the shake operation can be effectively prevented from being detected mistakenly. To put it concretely, in this case, information on an angle formed with respect to the gravitational-direction line as the postural angle of the portable electronic apparatus prior to a shake operation is acquired on the basis of values obtained during the past period with a length determined in advance as values of acceleration signals generated for a variety of axes and, the value of the shake count is incremented by 1 only on condition that the postural angle has a value within the angular range determined in advance in addition to the fact that two consecutive positive and negative peak values alternate and that the difference in timing between the two consecutive peak values has a value within a range determined in advance. In addition, the condition related to the posture of the portable electronic apparatus prior to a shake operation can be applied as a condition for whole detection of a shake operation instead of being applied as a condition for incrementing the value of a shake count by 1. That is to say, only if the postural angle of the portable electronic apparatus prior to a shake operation has a value within the angular range determined in advance, are a variety of conditions for detection of a shake operation tested in accordance with the flowchart shown in FIG. 15. In other words, if the postural angle of the portable electronic apparatus prior to a shake operation has a value not within the angular range determined in advance, the conditions shown in the flowchart of FIG. 15 are not tested.

In addition, in the case of the embodiment, a shake-on action is taken only on condition that the shake count has reached a value determined in advance. However, it is also possible to provide a configuration in which the condition for taking a shake-on action is changed. For example, instead of taking a shake-on action immediately after the shake count has reached the value determined in advance, a shake standby state is established when the shake count has reached a prescribed value obtained by subtracting a certain value from the value determined in advance. As an example, the certain value is 1. That is to say, a shake standby state is established when the shake count has reached a prescribed value of 5 obtained by subtracting the certain value of 1 from the predetermined value of 6. Then, after a shake standby state has been established, on the basis of a condition different from the condition requiring that the shake count shall have reached the value determined in advance, it is possible to produce a result of final determination as to whether or not a shake operation has been carried out. The shake standby state is a deferment state existing during a period with a length determined in advance. In the shake standby state, the mountain-related condition of the step S402 of the flowchart shown in FIG. 15 and the mountain-couple related condition of the step S405 of the same flowchart are exempted. As described earlier, the condition of the step S402 is a condition requiring that the 0-cross interval count shall have a value in a range determined in advance whereas the condition of the step S405 is a condition requiring that the positive and negative peak values of two successive mountains shall alternate. That is to say, the value of the shake count is incremented by 1 if only two conditions are satisfied. The first one of the two conditions is the mountain-related condition of the step S403 of the flowchart shown in FIG. 15 whereas the second one of the two conditions is the mountain-couple-related condition of the step S406 of the same flowchart. As described earlier, the mountain-related condition of the step S403 is a condition requiring that the peak value of an observed mountain shall be in a range determined in advance whereas the mountain-couple-related condition of the step S406 is a condition requiring that the difference in timing between two successive peak values shall have a value in a range determined in advance. Then, at the end of the shake standby state, a shake-on action is eventually taken if the shake count has a value within a range between the prescribed value obtained by subtracting the certain value from the value determined in advance and another value determined in advance. To put it concretely, at the end of the shake standby state, a shake-on action is eventually taken if the shake count has a value within a range between the prescribed value of 5 (=6−1) and the other predetermined value of typically 8. By changing the condition for taking a shake-on action as described above, a shake operation can be detected in a stable manner even if the definition of the shake operation varies individually from user to user.

In addition, in the case of the embodiment, the operation to detect a shake operation is processing based on software executed by the control unit 2. However, it is also possible to provide a configuration in which all or some of the processing to detect a shake operation is carried out by making use of hardware. For example, values of the evaluation signal are computed by making use of dedicated hardware.

On top of that, in the case of the embodiment, the operation to detect a shake operation is processing based on the shake-operation detection program 3a whereas the control operation following the detection of a shake operation is processing based on the control program 3b, which is executed separately from the execution of the shake-operation detection program 3a. However, it is possible to provide a software configuration in which the control program 3*b* and the shake-operation detection program 3*a* can be combined into a program or split into three or more programs to be executed separately from each other.

In addition, in the case of the embodiment, when the reproduction mode is switched from the normal reproduction mode to the shuffle reproduction mode or vice versa, a sound effect is output. However, it is not always necessary to output a sound effect. In place of a sound effect, for example, a predetermined string of characters or a figure determined in advance is displayed on the display screen unit 10A in order to notify the user that the reproduction mode has been switched from the normal reproduction mode to the shuffle reproduction mode or vice versa. As an alternative, a sound effect is output and a predetermined string of characters or a figure determined in advance is displayed on the display screen unit 10A. Anyway, techniques for notifying the user that the reproduction mode has been switched from the normal reproduction mode to the shuffle reproduction mode or vice versa should by no means be limited to the techniques based on a sound effect and such displays.

On top of that, in the case of the embodiment, upon detection of a shake operation, control is executed to switch the reproduction mode from the normal reproduction mode to the shuffle reproduction mode or vice versa as follow-up control of the detection of a shake operation. However, the control executed upon detection of a shake operation is by no means limited to the control to switch the reproduction mode from the normal reproduction mode to the shuffle reproduction mode or vice versa. That is to say, upon detection of a shake operation, any control can be executed to carry out an operation determined in advance as follow-up control of the detection of a shake operation.

In addition, in the case of the embodiment, as processing to detect a shake operation, the portable electronic apparatus concurrently carries out various kinds of processing such as the processing to compute values of the evaluation signal in accordance with the flowchart shown in FIG. 12, the processing to obtain the valued of a 0-cross interval count in accordance with the flowchart shown in FIG. 13, the processing to obtain peak values and timings of the peak values in accordance with the flowchart shown in FIG. 14 as well as the processing to detect a shake operation by making use the acquired values and information on the acquired timings in accordance with the flowchart shown in FIG. 15. However, it is also possible to provide a configuration in which some or all of these pieces processing is carried out as sequential processing.

On top of that, in the case of the embodiment, the acceleration sensor 12 is turned on while a content is being reproduced. However, it is also possible to provide a configuration in which the acceleration sensor 12 is kept in a turned-on state during a period other than reproduction of a content. For example, the acceleration sensor 12 can also be turned on in a sleep state. In the case of the embodiment, upon detection of a shake operation, control related to the reproduction function is executed to switch the reproduction mode from the normal reproduction mode to the shuffle reproduction mode or vice versa as follow-up control of the detection of a shake operation. Thus, by keeping the acceleration sensor 12 in a turning-on state only while a content is being reproduced, it is possible to execute follow-up control of detection of a shake operation as well as reduce the power consumption. Let us assume for example that the portable electronic apparatus also has a function to receive radio broadcasts as a typical function other than the function to reproduce contents stored in advance in the content storage unit 4. In this case, the portable electronic apparatus turns on the acceleration sensor 12 during execution of the other function. In this way, it is possible to execute proper follow-up control of detection of a shake operation as well as reduce the power consumption.

In addition, if the acceleration sensor 12 is used for two or more purposes such as the purpose of detecting a shake operation and a passometer purpose, for example, it is possible to provide a configuration in which the acceleration sensor 12 is switched from one state to another among the following three states: (1) a state of being turned on all the time, (2) a state of being turned on only during a process to reproduce a content or a process to receive a broadcasted signal and (3) a state of being turned off all the time. When the acceleration sensor 12 is put in state (1), for example, the passometer function can be executed provided that the user has not set the portable electronic apparatus to carry out a process to reproduce a content or a process to receive a broadcasted signal. When neither the passometer function nor the shake-operation detection function is being executed, the acceleration sensor 12 is put in state (3) in order to reduce the power consumption.

On top of that, the embodiment implements the portable content player provided by the present invention. However, the present invention can be applied suitably to a wide range of portable electronic apparatus.

In addition, it should be understood by those skilled in the art that a variety of modifications, combinations, sub-combinations and alterations may occur in dependence on design requirements and other factors insofar as they are within the scope of the appended claims or the equivalents thereof.

The invention claimed is:

1. A portable electronic apparatus comprising:
a content storage unit configured to store content data;
a display unit configured to display a screen showing at least a title of a content data stored in the content storage unit;
an acceleration detection unit configured to detect an acceleration from a movement of the whole said portable electronic apparatus, the acceleration unit configured to detect the acceleration on the basis of detecting a movement of the portable electronic apparatus in a direction perpendicular to the screen and a movement of the portable electronic apparatus in a direction parallel to the screen;
an evaluation-signal generation unit configured to perform a predetermined process based on said acceleration detected by said acceleration detection unit in order to generate an evaluation signal representing an amplitude and positive or negative polarity of said acceleration;
a control unit configured to produce a result of determination as to whether said portable electronic apparatus has been driven to make a predetermined movement on the basis of a vacillating acceleration force indicated by said evaluation signal, and perform a predetermined operation on the basis of said result of determination; and
a reproduction unit configured to reproduce the content data from the content storage unit,
wherein while the portable electronic apparatus is turned on, said control unit keeps said acceleration detection unit in an on state while said reproduction unit is reproducing the content data and turns off said acceleration detection unit when the reproducing of the content data is stopped.

2. The portable electronic apparatus according to claim 1, wherein said control unit produces a result of determination as to whether said portable electronic apparatus has been driven to make a predetermined movement on the basis of the amplitude, time, and positive or negative polarity of said evaluation signal.

3. The portable electronic apparatus according to claim 1, wherein said control unit is configured to perform:
- a 0-cross interval measurement process to measure a 0-cross interval between two consecutive 0 crosses of said evaluation signal;
- a peak-value detection process to detect a peak value appearing between said 0 crosses; and
- a determination process to produce a result of determination as to whether back-and-forth motions of said predetermined movement have been made on the basis of whether the 0-cross interval, the peak value detected by said 0-cross interval measurement process, and said peak-value detection process are values within ranges determined in advance.

4. The portable electronic apparatus according to claim 1, wherein said control unit is configured to perform:
- a 0-cross interval measurement process to measure a 0-cross interval between two consecutive 0 crosses of said evaluation signal;
- a peak-value detection process to detect a peak value appearing between said 0 crosses;
- a peak-value timing detection process to detect the timing of detection of said peak value;
- a 0-cross interval determination process to produce a result of determination as to whether a first 0-cross interval measured in said 0-cross interval measurement process has a value within a 0-cross interval range determined in advance;
- said 0-cross interval determination process produces a result of determination as to whether a second 0-cross interval measured in said 0-cross interval measurement process after said first 0-cross interval has a value within said 0-cross interval range;
- a peak-value determination process to produce a result of determination as to whether a first peak value detected in said peak-value detection process during said first 0-cross interval is within a peak-value range determined in advance;
- said peak-value determination process produces a result of determination as to whether a second peak value detected in said peak-value detection process during said second 0-cross interval is within said peak-value range;
- a first movement determination process to produce a result of determination as to whether a first one of back-and-forth motions of said predetermined movement has been made on the basis of said determination result produced in said 0-cross interval determination process carried out for said first 0-cross interval and said determination result produced in said peak-value determination process for said first peak value;
- a second movement determination process to produce a result of determination as to whether a second one of back-and-forth motions of said predetermined movement has been made on the basis of said determination result produced in said 0-cross interval determination process carried out for said second 0-cross interval and said determination result produced in said peak-value determination process for said second peak value;
- a timing determination process to produce a result of determination as to whether a difference in timing between said first and second peak values is within a timing range determined in advance and a result of determination as to whether the polarity of said first peak value is opposite to the polarity of said second peak value if said determination results produced in said second movement determination process indicate that said first and second ones of said back-and-forth motions have been made; and
- a back-and-forth motion determination process to produce a result of determination as to whether said back-and-forth motions have been made as said predetermined movement on the basis of said determination results produced in said timing determination process.

5. The portable electronic apparatus according to claim 1, wherein said control unit is configured to perform:
- a 0-cross interval measurement process to measure a 0-cross interval between two consecutive 0 crosses of said evaluation signal;
- a peak-value detection process to detect a peak value appearing between said 0 crosses;
- a peak-value timing detection process to detect the timing of detection of said peak value;
- a first determination process that produces an affirmation result if 0-cross intervals measured in said 0-cross interval measurement process have values within a 0-cross interval range determined in advance;
- a second determination process that produces an affirmation result if peak values detected in said peak-value detection process during said 0-cross interval are within peak-value ranges determined in advance;
- a third determination process that produces an affirmation result if a shake count has a value at least equal to 1;
- a fourth determination process that produces an affirmation result if the polarity of the first peak value is opposite to the polarity of the preceding peak value;
- a fifth determination process that produces an affirmation result if a difference in timing between the peak value and the preceding peak value has a value within a timing range determined in advance;
- a shake-count value setting process to set said value of said shake count at 1 if said determination results produced in said first and second determination processes are both an affirmation result whereas said determination result produced in said third determination process is not an affirmation result;
- a shake-count value incrementing process to increment said value of said shake count by 1 if said determination results produced in all said first to fifth determination processes are each an affirmation result; and
- a determination process to determine that a shake operation has been carried out if said shake count reaches a value determined in advance.

6. The portable electronic apparatus according to claim 1, wherein said control unit produces:
- a first result of determination as to whether said portable electronic apparatus has been put in a still state continuously for a predetermined period of time before being driven to make said predetermined movement on the basis of an acceleration detected by said acceleration detection unit; and
- a second result of determination as to whether said portable electronic apparatus has been driven to make said predetermined movement on the basis of said first result of determination.

7. The portable electronic apparatus according to claim 1, wherein said control unit turns on said acceleration detection unit under a condition determined in advance.

8. The portable electronic apparatus according to claim 1, wherein said control unit is configured to control performance of said predetermined operation if a result of determination indicates that said portable electronic apparatus has been driven to make a predetermined movement, and control to prevent said predetermined operation from being carried out again during a predetermined period following execution of said predetermined operation.

9. The portable electronic apparatus according to claim 1, wherein:
said control unit is configured to control switching a reproduction mode of a process carried out by said reproduction unit to reproduce the content data from the content storage unit from a normal reproduction mode to a shuffle reproduction mode or vice versa; and
when a result of determination indicates that said portable electronic apparatus has been driven to make a predetermined movement, said control unit controls switching said reproduction mode from said normal reproduction mode to said shuffle reproduction mode or vice versa.

10. The portable electronic apparatus according to claim 9, wherein, when said reproduction mode is switched from said normal reproduction mode to said shuffle reproduction mode, said control unit controls said reproduction unit to start reproduction of a content data other than a content data being reproduced so far in said normal reproduction mode, and
when said reproduction mode is switched from said shuffle reproduction mode to said normal reproduction mode, said control unit controls said reproduction unit to continue reproduction of a content being reproduced so far in said shuffle reproduction mode.

11. A control method adopted by a portable electronic apparatus having an acceleration detection unit for detecting an acceleration of said portable electronic apparatus, said control method comprising the steps of:
storing content data on a content storage unit of the portable electronic apparatus; displaying a screen on a display unit of the portable electronic apparatus showing at least a title of a content data stored in the content storage unit;
detecting the acceleration of said portable electronic apparatus from a movement of the whole said portable electronic apparatus on the basis of detecting a movement of the portable electronic apparatus in a direction perpendicular to the screen and a movement of the portable electronic apparatus in a direction parallel to the screen;
performing a predetermined process based on said acceleration detected by said acceleration detection unit in order to generate an evaluation signal representing an amplitude and positive or negative polarity of said acceleration;
producing a result of determination as to whether said portable electronic apparatus has been driven to make a predetermined movement on the basis of a vacillating acceleration force indicated by said evaluation signal generated in said evaluation-signal generation procedure and performing a predetermined operation on the basis of said result of determination;
reproducing the content data from the content storage unit; and
while the portable electronic apparatus is turned on, keeping said acceleration detection unit in an on state while reproducing the content data and turning off said acceleration detection unit when the reproducing of the content data is stopped.

12. A non-transitory computer readable storage medium storing computer instructions which cause a portable electronic apparatus to perform a method of:
storing content data on a content storage unit of the portable electronic apparatus;
displaying a screen on a display unit of the portable electronic apparatus showing at least a title of a content data stored in the content storage unit;
detecting an acceleration of said portable electronic apparatus from a movement of the whole said portable electronic apparatus on the basis of detecting a movement of the portable electronic apparatus in a direction perpendicular to the screen and a movement of the portable electronic apparatus in a direction parallel to the screen;
performing a predetermined process based on the acceleration detected by an acceleration detection unit of said portable electronic apparatus in order to generate an evaluation signal representing an amplitude and positive or negative polarity of said acceleration;
producing a result of determination as to whether said portable electronic apparatus has been driven to make a predetermined movement on the basis of said evaluation signal generated in said evaluation-signal generation procedure and performing a predetermined operation on the basis of said result of determination;
reproducing the content data from the content storage unit; and
while the portable electronic apparatus is turned on, keeping said acceleration detection unit in an on state while reproducing the content data and turning off said acceleration detection unit when the reproducing of the content data is stopped.

13. A portable electronic apparatus comprising:
content storing means for storing content data;
displaying means for displaying a screen showing at least a title of a content data stored in the content storage means;
acceleration detection means for detecting an acceleration from a movement of the whole said portable electronic apparatus, and for detecting the acceleration on the basis of detecting a movement of the portable electronic apparatus in a direction perpendicular to the screen and a movement of the portable electronic apparatus in a direction parallel to the screen;
evaluation-signal generation means for performing a predetermined process based on said acceleration detected by said acceleration detection means in order to generate an evaluation signal representing an amplitude and positive or negative polarity of said acceleration;
control means for producing a result of determination as to whether said portable electronic apparatus has been driven to make a predetermined movement on the basis of a vacillating acceleration force indicated by said evaluation signal generated by said evaluation-signal generation means and performing a predetermined operation on the basis of said result of determination; and
reproducing means for reproducing the content data from the content storage means,
wherein while the portable electronic apparatus is turned on, said control means keeps said acceleration detection means in an on state while said reproducing means is reproducing the content data and turns off said acceleration detection means when the reproducing of the content data is stopped.

14. A portable electronic apparatus comprising:
a content storage unit configured to store content data;
a display unit configured to display a screen showing at least a title of a content data stored in the content storage unit;

an acceleration detection unit configured to detect an acceleration from a movement of the whole said portable electronic apparatus, the acceleration unit configured to detect the acceleration on the basis of detecting a movement of the portable electronic apparatus in a direction perpendicular to the screen and a movement of the portable electronic apparatus in a direction parallel to the screen;

an evaluation-signal generation unit configured to perform a predetermined process based on said acceleration detected by said acceleration detection unit in order to generate an evaluation signal representing an amplitude and positive or negative polarity of said acceleration;

a control unit configured to produce a result of determination as to whether said portable electronic apparatus has been driven to make a predetermined movement on the basis of said evaluation signal, and perform a predetermined operation on the basis of said result of determination, wherein the predetermined movement is determined to have occurred when a user performs a plurality of successive movements of the portable electronic apparatus, each of the successive movements being determined when the evaluation signal exhibits a threshold value of a first polarity during a first time period and a threshold value of a second polarity opposite to the first polarity during a second time period after the first time period; and a reproduction unit configured to reproduce the content data from the content storage unit, wherein while the portable electronic apparatus is turned on, said control unit keeps said acceleration detection unit in an on state while said reproduction unit is reproducing the content data and turns off said acceleration detection unit when the reproducing of the content data is stopped.

* * * * *